(12) United States Patent
Mutha et al.

(10) Patent No.: US 11,593,147 B2
(45) Date of Patent: Feb. 28, 2023

(54) DETERMINING SERVER FARM CAPACITY AND PERFORMANCE

(71) Applicant: Microsoft Technology Licensing, LLC, Redmond, WA (US)

(72) Inventors: Akshay Navneetlal Mutha, Sammamish, WA (US); Peilin Hao, Issaquah, WA (US); Hao Zuo, Bellevue, WA (US); Marc Keith Windle, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 144 days.

(21) Appl. No.: 17/160,012

(22) Filed: Jan. 27, 2021

(65) Prior Publication Data

US 2022/0171647 A1 Jun. 2, 2022

Related U.S. Application Data

(60) Provisional application No. 63/119,991, filed on Dec. 1, 2020.

(51) Int. Cl.
*G06F 9/455* (2018.01)
*H04L 12/24* (2006.01)
(Continued)

(52) U.S. Cl.
CPC ...... *G06F 9/45558* (2013.01); *H04L 41/0816* (2013.01); *H04L 43/08* (2013.01);
(Continued)

(58) Field of Classification Search
CPC ....... G06F 9/45558; G06F 2009/45575; G06F 2009/45591; G06F 2009/45595;
(Continued)

(56) References Cited

U.S. PATENT DOCUMENTS 7,562,239 B2 7/2009 Fung
7,756,972 B2 7/2010 Ma
(Continued)

FOREIGN PATENT DOCUMENTS

CN 110289994 A 9/2019
WO 2016154801 A1 10/2016

OTHER PUBLICATIONS

Vageesan, Gopinath, "On improving performance and conserving power in cluster-based web servers", In Thesis of Office of Graduate Studies of Texas A&M University, Dec. 2005, 61 Pages.
"International Search Report and Written Opinion Issued in PCT Application No. PCT/US2021/054886", dated Feb. 8, 2022, 12 Pages.

*Primary Examiner* — Kostas J Katsikis
(74) *Attorney, Agent, or Firm* — NovoTechIP International PLLC

(57) ABSTRACT

A data processing system for determining a capacity of a server farm implements determining a first operating parameter indicative of a utilization status of a server farm comprising a plurality of virtual machines; determining that the first operating parameter falls within a first range of operating values in which capacity testing of the server farm is performed; capacity testing the server farm to determine a capacity estimate by iteratively configuring a virtual machine of the plurality of virtual machines operating in an active state to operate in a sleep state until the first operating parameter reaches an upper threshold associated with the first range of operating values and monitoring performance of the plurality of virtual machines; modifying configuration parameters of the server farm to adjust an amount of available computing capacity based on the capacity estimate; and operating the server farm based on the updated configuration parameters.

20 Claims, 15 Drawing Sheets

(51) Int. Cl.
*H04L 12/26* (2006.01)
*H04L 41/0816* (2022.01)
*H04L 43/08* (2022.01)

(52) U.S. Cl.
CPC ............. *G06F 2009/45575* (2013.01); *G06F 2009/45591* (2013.01); *G06F 2009/45595* (2013.01)

(58) Field of Classification Search
CPC ......... H04L 43/08; H04L 43/16; H04L 43/20; H04L 43/50
See application file for complete search history.

(56) References Cited

U.S. PATENT DOCUMENTS

| | | |
|---|---|---|
| 8,250,382 B2 | 8/2012 | Maglione et al. |
| 8,516,284 B2 | 8/2013 | Chan et al. |
| 8,887,172 B2 | 11/2014 | Bernardi et al. |
| 10,270,711 B2* | 4/2019 | Chen ..................... G06F 9/4887 |
| 2005/0268078 A1* | 12/2005 | Zimmer .............. G06F 9/45533 713/1 |
| 2007/0288274 A1 | 12/2007 | Chao et al. |
| 2009/0254763 A1 | 10/2009 | Belady et al. |
| 2016/0335111 A1* | 11/2016 | Bruun ..................... H04L 41/50 |
| 2018/0349168 A1 | 12/2018 | Ahmed |
| 2021/0224121 A1* | 7/2021 | Ganti .................. G06F 9/45558 |

* cited by examiner

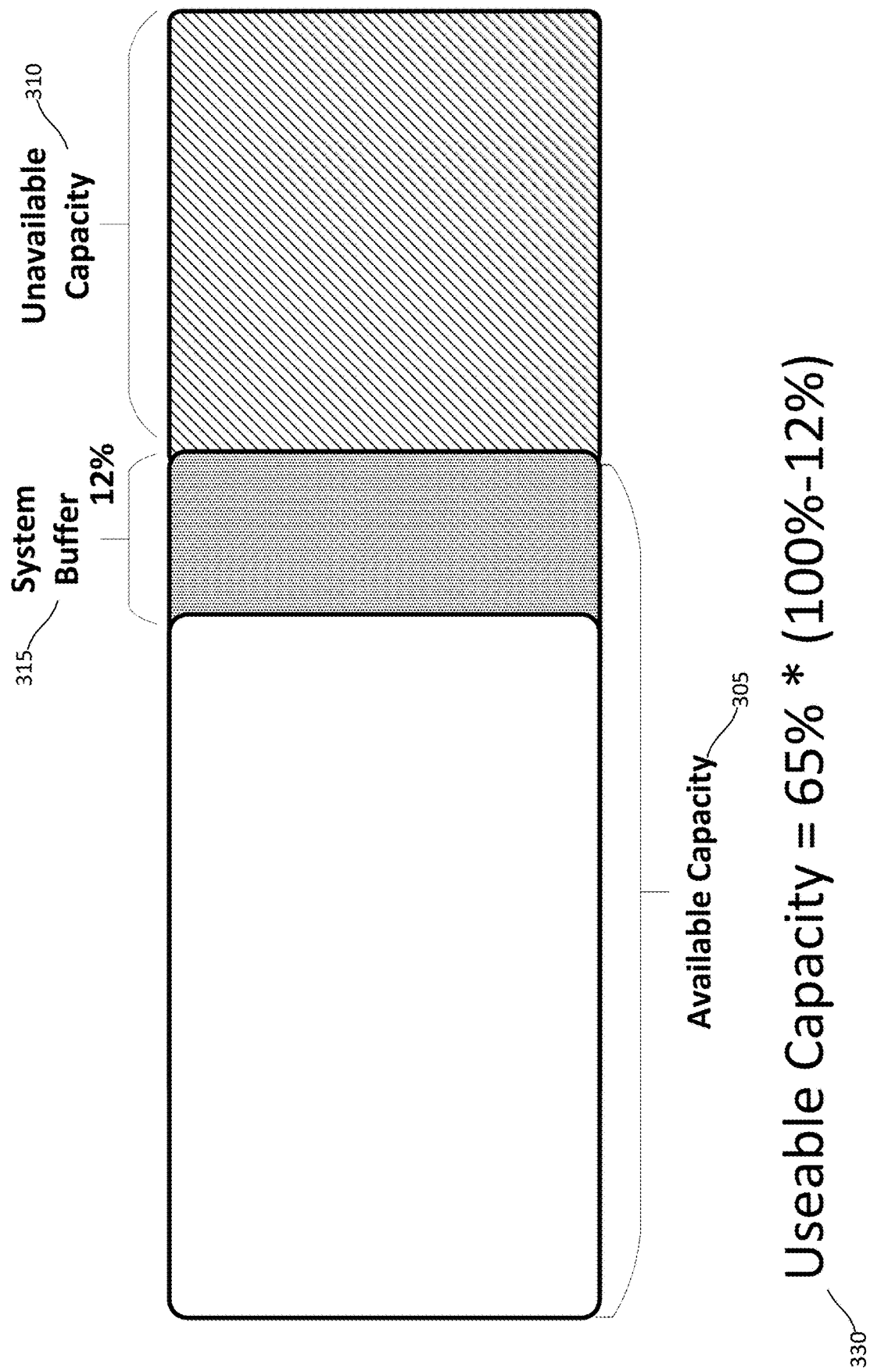

DETERMINING SERVER FARM CAPACITY AND PERFORMANCE

CROSS-REFERENCE TO RELATED APPLICATIONS

This application claims the benefit of priority from U.S. Provisional Patent Application Ser. No. 63/119,991, filed on Dec. 1, 2020, and entitled "Determining Server Farm Capacity and Performance."

BACKGROUND

A server farm is a logical collection of servers that are working together to provide a service or services to one or more customers or tenants of the server farm. The services may include supporting a web application or web applications or other such services. The server farm may include multiple servers and each server may be configured to run one or more virtual machines. Each virtual machine may provide services to a particular tenant of the server farm. The exact number of servers associated with the farm and the number of virtual machines provided by the servers may be a factor of an estimated capacity of the server farm and the anticipated demands for that capacity by the tenants. The server farm provider typically provides excess computing capacity beyond the anticipated capacity to seamlessly support tenant needs in the event that one or more of the virtual machines experiences problems and needs to be taken offline and/or there is a spike in demand by one or more of the tenants. Furthermore, the system may not have been fully tested to understand how the system will perform under high capacity so more excess capacity is maintained than is probably necessary to support such surges. However, maintaining such excess computing capacity is expensive. Hence, there is a need for improved systems and methods of determining how much excess capacity should be maintained by the server farm without compromising the user experience provided by the services supported by the server farm.

SUMMARY

An example data processing system according to the disclosure may include a processor and a computer-readable medium storing executable instructions. The instructions when executed cause the processor to perform operations including determining a first operating parameter indicative of a utilization status of a server farm comprising a plurality of virtual machines; determining that the first operating parameter falls within a first range of operating values in which capacity testing of the server farm is performed; capacity testing the server farm to determine a capacity estimate by iteratively configuring a virtual machine of the plurality of virtual machines operating in an active state to operate in a sleep state until the first operating parameter reaches an upper threshold associated with the first range of operating values and monitoring performance of the plurality of virtual machines; modifying configuration parameters of the server farm to adjust an amount of available computing capacity based on the capacity estimate; and operating the server farm based on the updated configuration parameters.

An example method implemented in a data processing system for determining a capacity of a server farm includes determining a first operating parameter indicative of a utilization status of a server farm comprising a plurality of virtual machines; determining that the first operating parameter falls within a first range of operating values in which capacity testing of the server farm is performed; capacity testing the server farm to determine a capacity estimate by iteratively configuring a virtual machine of the plurality of virtual machines operating in an active state to operate in a sleep state until the first operating parameter reaches an upper threshold associated with the first range of operating values and monitoring performance of the plurality of virtual machines; modifying configuration parameters of the server farm to adjust an amount of available computing capacity based on the capacity estimate; and operating the server farm based on the updated configuration parameters.

An example computer-readable storage medium on which are stored instructions. The instructions when executed cause a processor of a programmable device to perform functions of determining a first operating parameter indicative of a utilization status of a server farm comprising a plurality of virtual machines; determining that the first operating parameter falls within a first range of operating values in which capacity testing of the server farm is performed; capacity testing the server farm to determine a capacity estimate by iteratively configuring a virtual machine of the plurality of virtual machines operating in an active state to operate in a sleep state until the first operating parameter reaches an upper threshold associated with the first range of operating values and monitoring performance of the plurality of virtual machines; modifying configuration parameters of the server farm to adjust an amount of available computing capacity based on the capacity estimate; and operating the server farm based on the updated configuration parameters.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3 is a diagram that shows how the usable capacity 330 of the server farm of the preceding examples may be determined.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for addressing the technical problem of determining the actual capacity of a server farm are provided. The server farm may include numerous virtual machines which are maintained in an active state in which the virtual machines are capable of handling requests from tenants. Incoming requests may be distributed among these virtual machines to balance the load on each of the virtual machines. A predetermined amount of computing capacity is held in reserve in case one or more of the virtual machines experiences problems and needs to be taken offline temporarily for repair so that the remaining virtual machines are not overloaded. This reserved capacity (also referred to herein as "unavailable capacity") is typically an estimate and may reserve far more capacity than necessary.

The techniques provided herein provide a technical solution to the technical problem of determining an improved estimate of the capacity of the server farm by introducing a sleep state in which one or more virtual machines of a plurality of virtual machines of a server farm may be temporarily placed. The virtual machines in the sleep state are maintained in a ready and healthy state where the virtual machines may be immediately returned to an active state if necessary. The load balancer allocates incoming requests to the remaining virtual machines to test their performance under increased utilization. If no problems arise responsive to this capacity testing, reserved capacity may be reduced and made available for use by the server farm. However, if problems do arise responsive to the capacity testing, the virtual machines that were previously placed in the sleep state may be immediately returned to the rotation of virtual machines handling requests from the tenants to reduce the utilization of the servers across the server farm. A technical benefit of this approach is that high utilization of the virtual machines can be tested without negatively impacting the user experience, because the virtual machines held in the sleep state are immediately returned to service when performance problems are detected during the capacity testing. Another technical benefit is that the resources of the server farm may be used more efficiently with less of the capacity of the farm being held as reserved capacity. These and other technical benefits of the techniques provided herein will be evident from the examples which follow.

Figure 1:
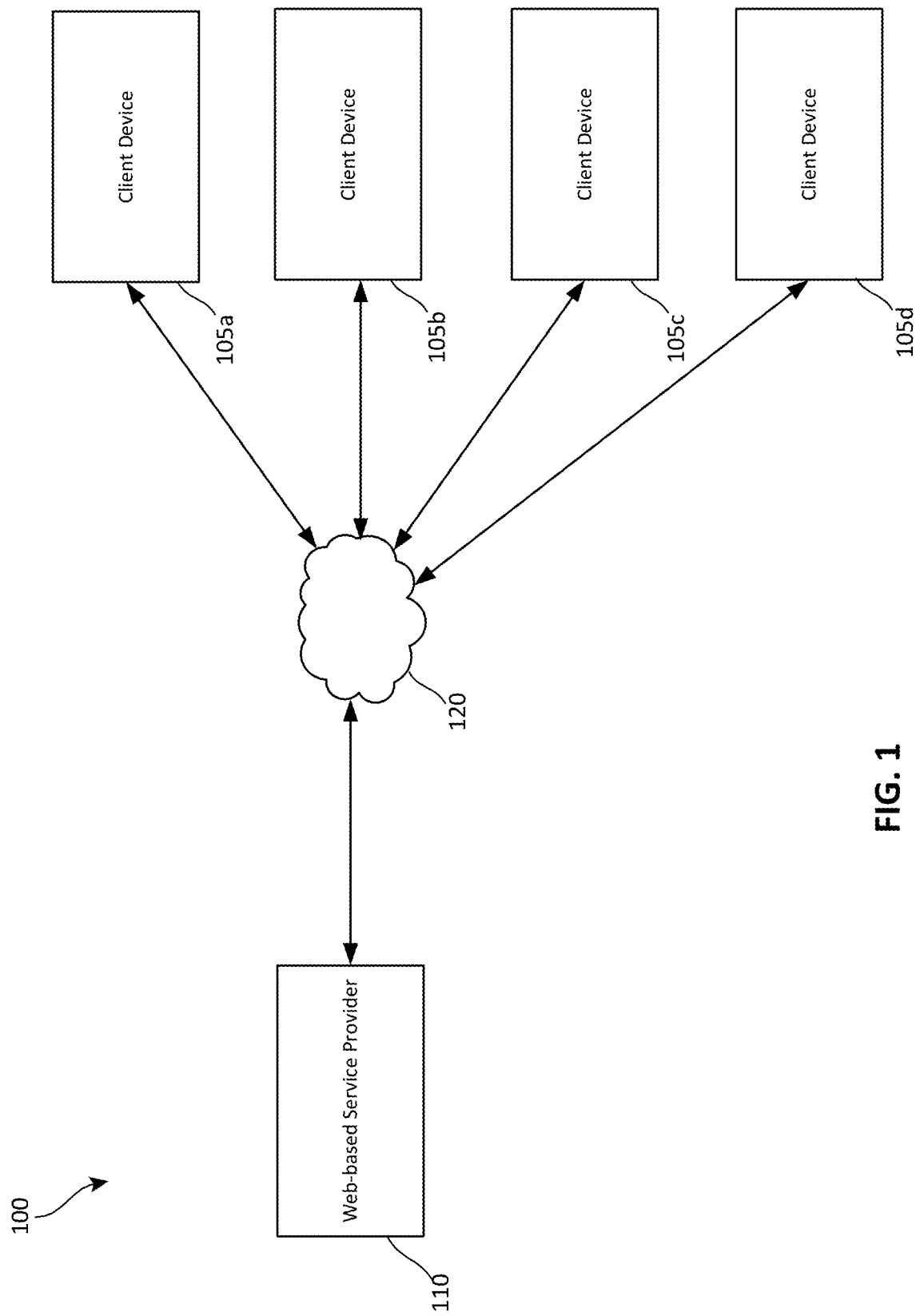
FIG. 1 illustrates an example computing environment 100 in which the techniques disclosed herein may be implemented.

FIG. 1 illustrates an example computing environment 100 in which the techniques disclosed herein may be implemented. The computing environment 100 may include web-based service provider 110 that may implement the techniques disclosed herein for predicting actual capacity needs of the users of the services provided by the web-based service provider. The computing environment 100 may also include client devices 105*a*, 105*b*, 105*c*, and 105*d*.

The web-based service provider may communicate with the client device 105*a*, 105*b*, 105*c*, and 105*d* via a network 120. The network 120 may be a public network, a private network, or a combination thereof. The public network may be implemented by the Internet. The private network may be an institutional network or intranet.

The web-based service provider 110 may provide a web-based application or applications and/or other services to one or more tenants. The tenants may subscribe with a service provider to gain access to the services provided by the web-based services provider 100. The web-based application and/or other services provided by the web-based service provider 110 may be accessed by users associated with the one or more tenants via the client devices 105*a*, 105*b*, 105*c*, and 105*d*. The example shown in FIG. 1 shows only four client devices for the sake of clarity, but implementation of the web-based service provider 110 may include more than the four client devices shown.

The client devices 105*a*, 105*b*, 105*c*, and 105*d* are computing devices that may be implemented as a portable electronic device, such as a mobile phone, a tablet computer, a laptop computer, a portable digital assistant device, a portable game console, and/or other such devices. The client devices 105*a*, 105*b*, 105*c*, and 105*d* may also be implemented in computing devices having other form factors, such as a vehicle onboard computing system, a kiosk, a point of sale system, a video game console, a desktop computer, and/or other types of computing devices. The client devices 105*a*, 105*b*, 105*c*, and 105*d* may include a web browser and/or a native application or applications that may be configured to access the services provided by the web-based service provider 110. The requests received from the client devices 105*a*, 105*b*, 105*c*, and 105*d* may be distributed among a set of virtual machines implemented by the web-based service provider 110. While the example implementation illustrated in FIG. 1 includes four client devices, other implementations may include more client devices associated with one or more tenants of the web-based service provider 110.

The web-based service provider 110 may implement a server farm that includes a set of virtual machines that are configured to handle incoming requests from tenants. FIGS. 2A-2I show examples of how the virtual machines in such a server farm may be rotated in out of service to test the capacity of the server farm according to the techniques provided herein. In the examples shown in FIGS. 2A-2I, the server farm only includes six virtual machines. Other implementations may include tens, hundreds, or more virtual machines. The web-based service provider 110 may include a rotation manager that is configured to move virtual machines into one of the various states described below to implement the capacity testing. A virtual machine may be moved from one logical state to another logical state by changing one or more operating parameters of the virtual machine. Rotating a virtual machine out of service, as used herein, refers to changing a logical state of the virtual machine from an active state in which the virtual machine may process requests from a tenant of the server farm to an inactive state in which the virtual machine is taken out of service or to a sleep state in which the virtual machine is ready to process requests but has been temporarily been excluded from receiving incoming requests from tenants. Similarly, rotating a virtual machine into service, as used herein, refers to changing a logical state of the virtual machine from the out of service state or the sleep state and into the active state.

The rotation manager discussed with respect to FIGS. 2A-2I performs capacity testing based on the overall CPU usage of the virtual machines of the server farm. However, other implementations may measure other factors, such as latency and/or available memory. The rotation manager may be configured to measure one or more of such factors to determine whether capacity testing may be performed, whether to move one or more virtual machines to the sleep state, and/or to move the virtual machines in the sleep state back to the active state.

Figure 2A:
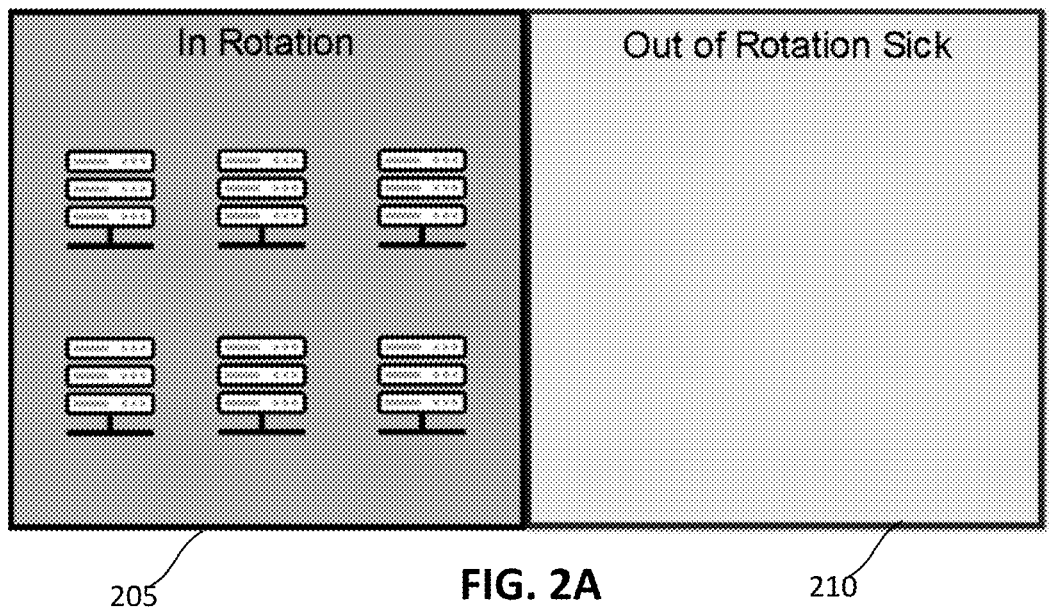
FIGS. 2A-2I show examples of how virtual machines from a server farm may be rotated in and out of service according to the techniques provided herein.

FIG. 2A shows an example in which all six of the virtual machines of the server farm are in the active state 205 (also referred to herein as "in rotation" state) and none of the virtual machines are in the inactive state 210 (also referred to herein as a "sick" state). The virtual machines in the active state 205 are ready to process incoming requests from tenants, and the load balancer of the server farm may allocate incoming requests to the virtual machines in the active state 210. Virtual machines experiencing performance problems may be moved from the active state 205 to the inactive state 210 so that the issues causing the performance problems may be addressed. A healing process may be performed on any virtual machines that are moved into the inactive state 210. The healing process may include various actions that may be used to diagnose and correct the issues causing the performance problems, such as but not limited to rebooting or restarting the virtual machine, clearing processes being executed by the virtual machine, and/or other corrective actions that may improve the performance of the virtual machine and permit it to be returned to the active state 205.

Figure 2B:
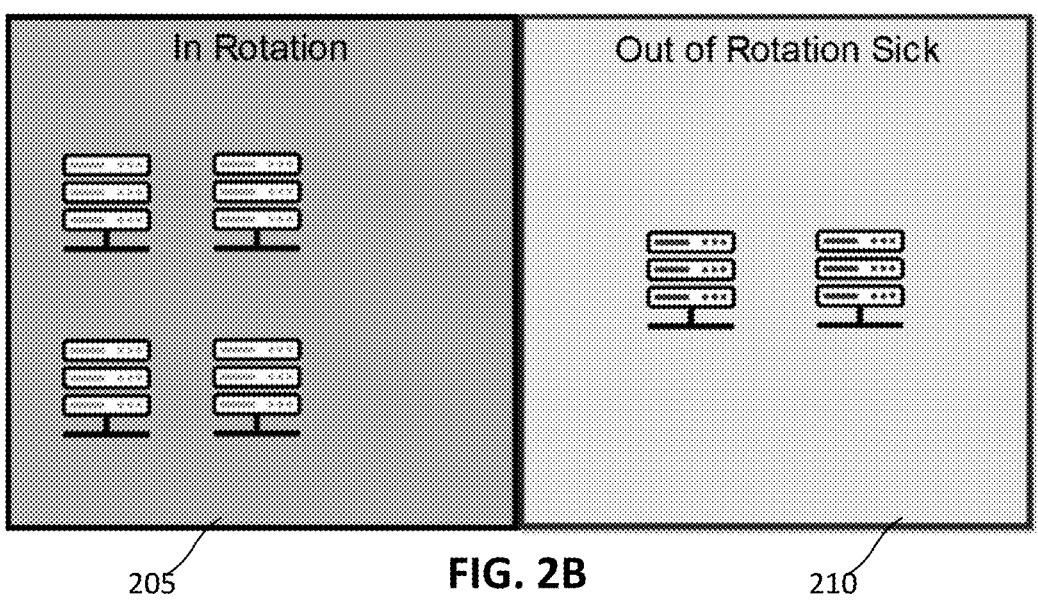
Figure 2C:
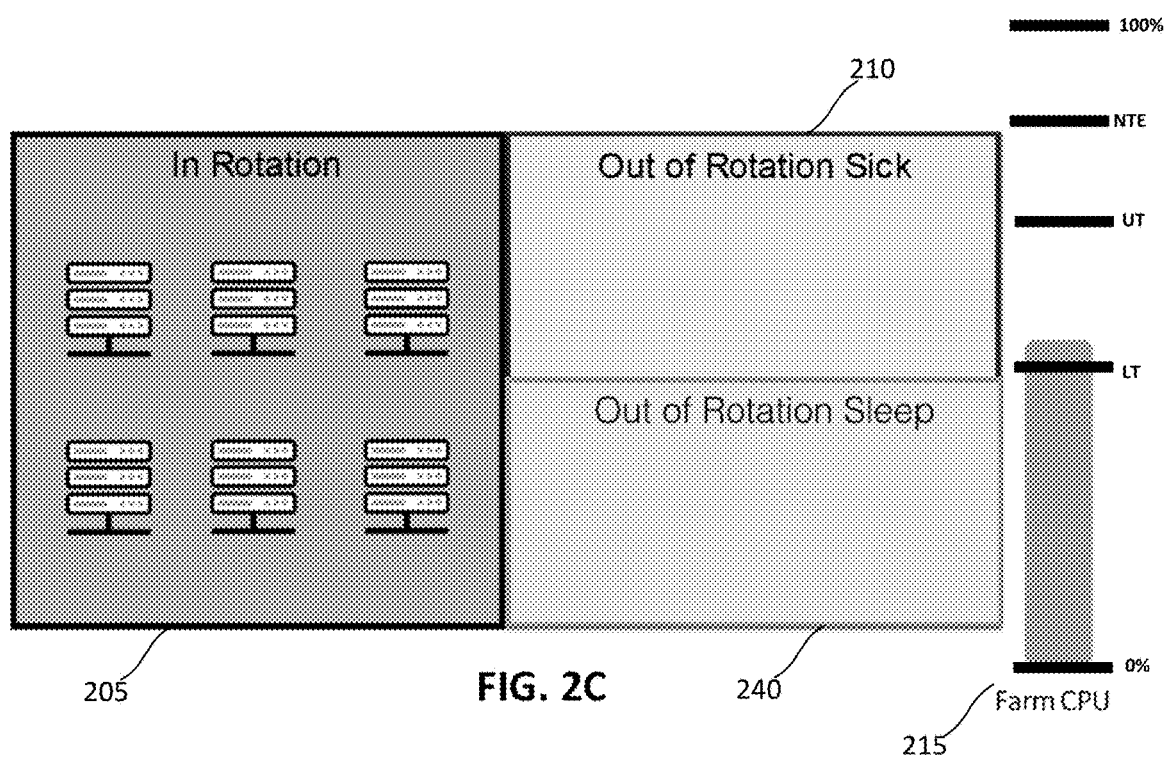
Figure 4A:
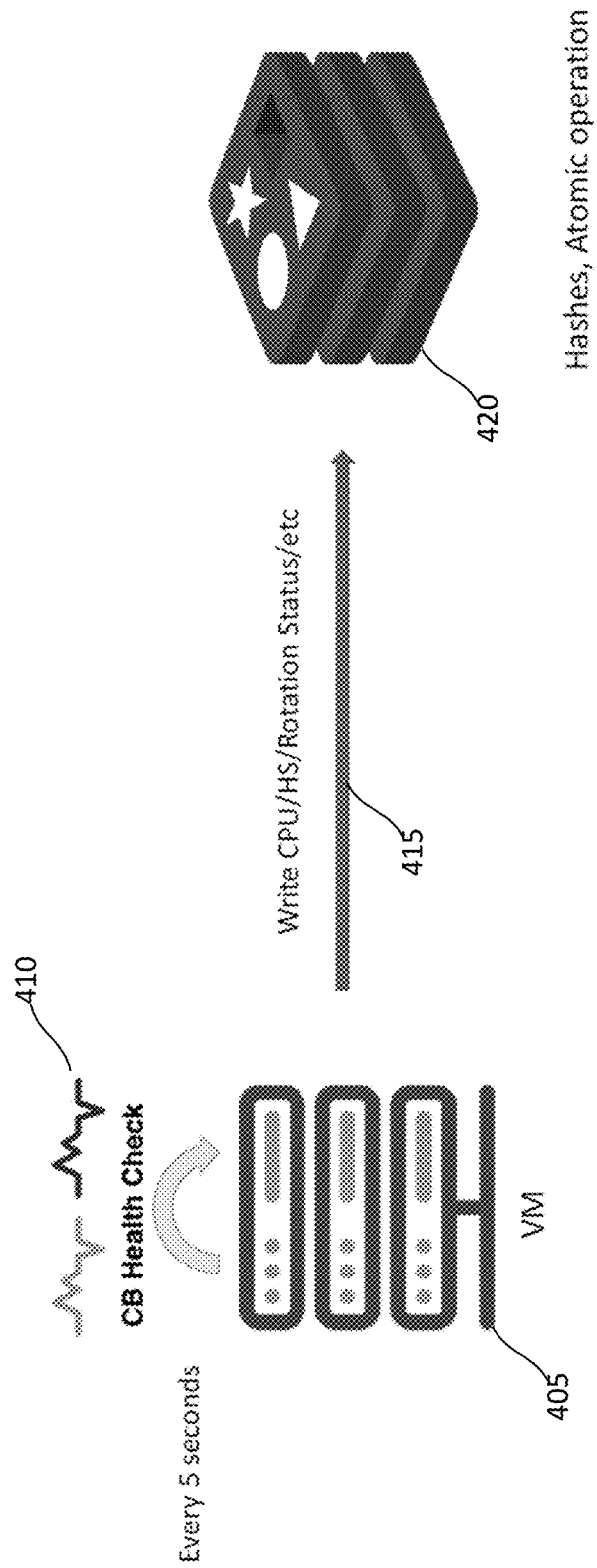
FIG. 4A is a diagram showing the how health information may be collected for each of the virtual machines of a server farm.
Figure 4B:
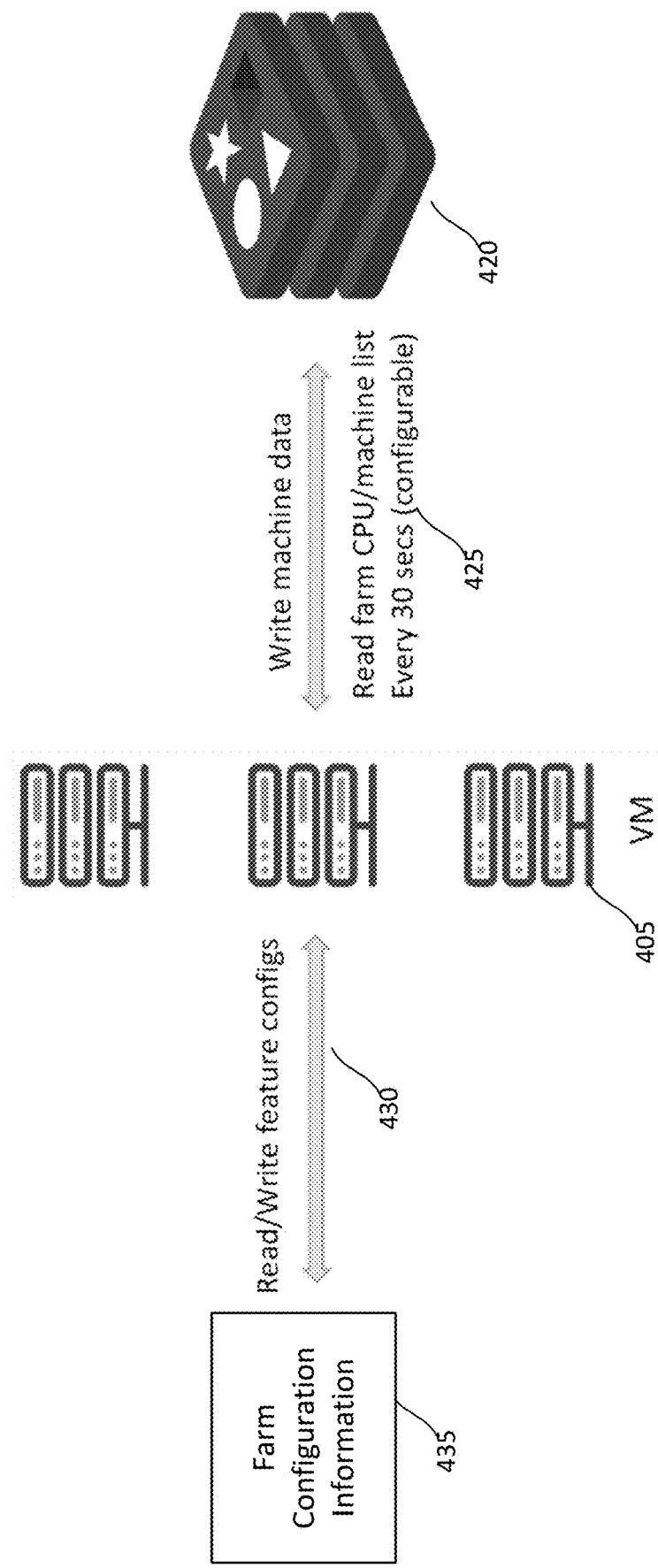
FIG. 4B is a diagram showing how the farm configuration information may be updated based on the virtual machine health information stored in the data store 420.

FIG. 2B shows an example in which two of the six virtual machines that were previously in rotation have been moved from the active state 205 to the inactive state 210 in response to diagnosing performance problems with those two virtual machines. FIGS. 4A and 4B, which are discussed in detail below, provide examples in which health checks are performed on the virtual machines to identify problems for which the machine should be moved into the inactivate state 210. The virtual machines moved to the inactive state 210 by the rotation manager remain in this state until the virtual machines are once again ready to process incoming requests. The rotation manager may then move the formerly sick virtual machines from the inactive state 210 to the active state 205.

In the examples shown in FIGS. 2A and 2B, the virtual machines may be moved between two states. The examples shown in FIGS. 2C-2H introduce a third state, a "sleep" state in which the virtual machines are maintained in a ready and healthy state in which the virtual machines may be immediately returned to the active state 205. This sleep state may be used to facilitate the capacity testing techniques disclosed herein. The rotation manager may be configured to move one or more virtual machines from the active state 205 to the sleep state 240 to increase the utilization of the virtual machines remaining in the active state 205. A technical benefit of this approach is that the performance of the farm at higher utilization rates may be safely tested to determine if there are any performance problems which may occur when virtual machines of the server farm are being used at the higher utilization rate. If any problems occur, the rotation manager may immediately move the virtual machines from the sleep state 240 to the active state 205 to immediately provide additional capacity into the server farm and to reduce the utilization rates of the virtual machines in the active state 205. Thus, any performance problems resulting from the increased utilization rate that may have negatively impacted the user experience may be avoided through the reintroduction of the additional processing capacity of the formerly "sleeping" virtual machines. This approach allows for high-capacity testing in a live system to determine a better estimate of the actual capacity of the server farm without the risk of impacting the user experience.

FIGS. 2C-2H show examples in which the virtual machines may be moved into the sleep state to increase the utilization of the system and to test performance of the system under these higher utilization rates. FIGS. 2C-2H reference a set of CPU usage levels shown in FIG. 2I. The rotation manager monitors the CPU usage of the farm and performs various actions in response to the CPU usage reaching each of these usage levels. The CPU usage levels (also referred to herein as "usage thresholds" or "usage bounds") shown in FIG. 2I may be configurable by an administrator of the server farm to test how different utilization scenarios may impact the usage of the farm. Furthermore, these thresholds may be automatically configured based on testing performed using the techniques provided herein. If the capacity testing shows that the system may perform at a higher capacity with lower reserved capacity, the thresholds may be adjusted accordingly to test the performance of the system under higher utilization rates. Similarly, if performance problems are detected in response to testing at a particular capacity, the system may be tested with a lower utilization rate and higher reserved capacity to determine whether the performance problems occur because of the higher utilization but do not occur at a lower utilization of the processing capabilities of the virtual machines of the server farm. While FIGS. 2C-2H show capacity testing based on the overall CPU usage of the server farm, capacity testing may be perform using other operating parameters of the server farm, such as but not limited to memory utilization and and/or a degree of latency introduced by the virtual machines.

Figure 2D:
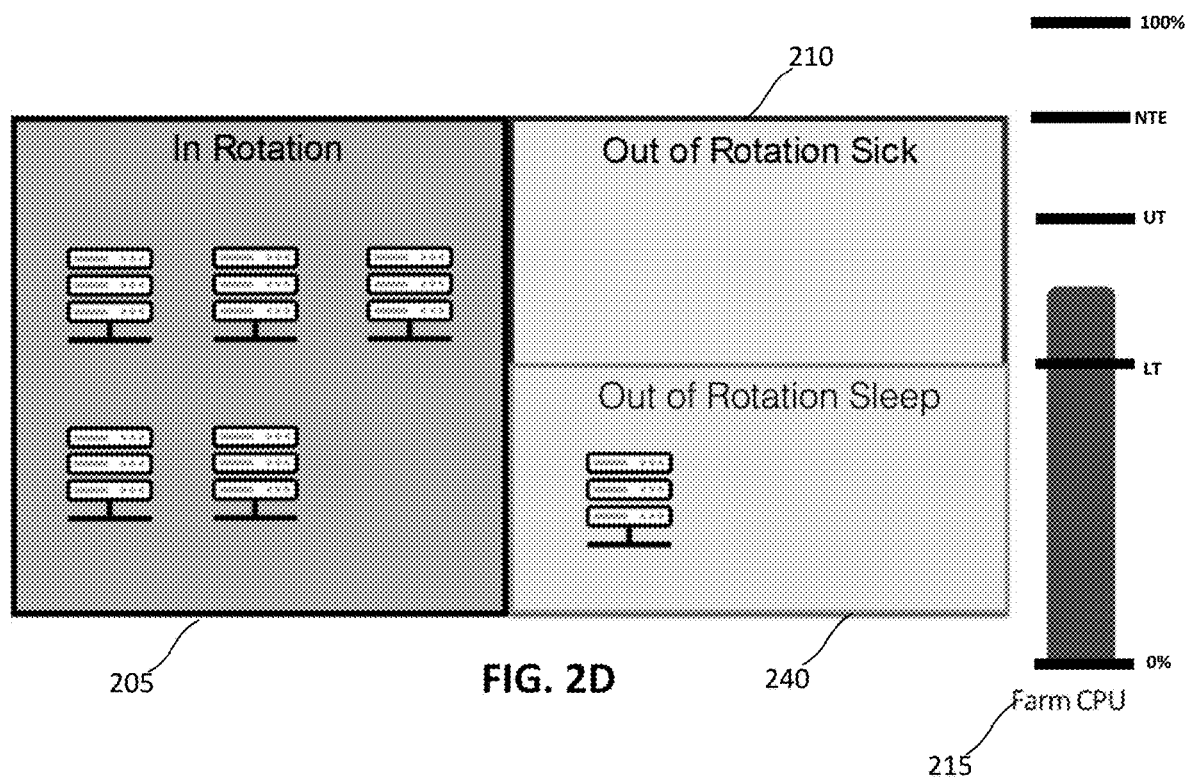
Figure 2E:
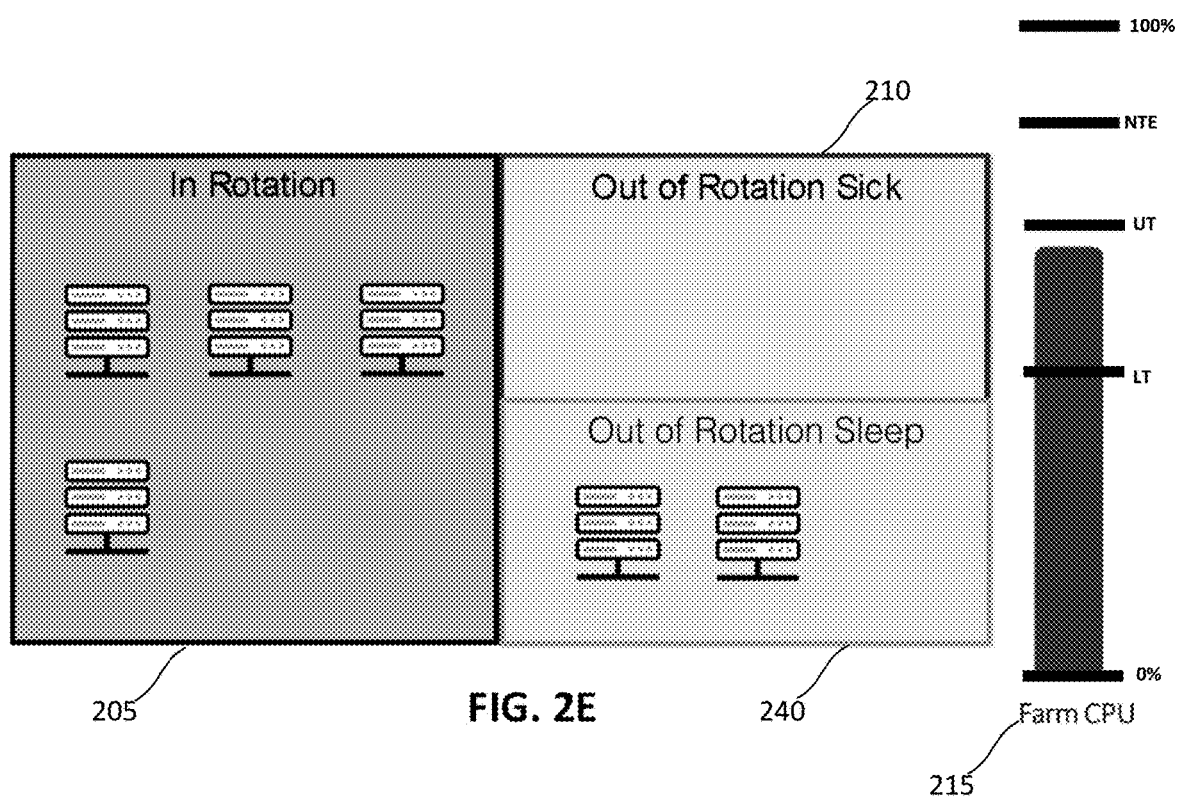
Figure 2F:
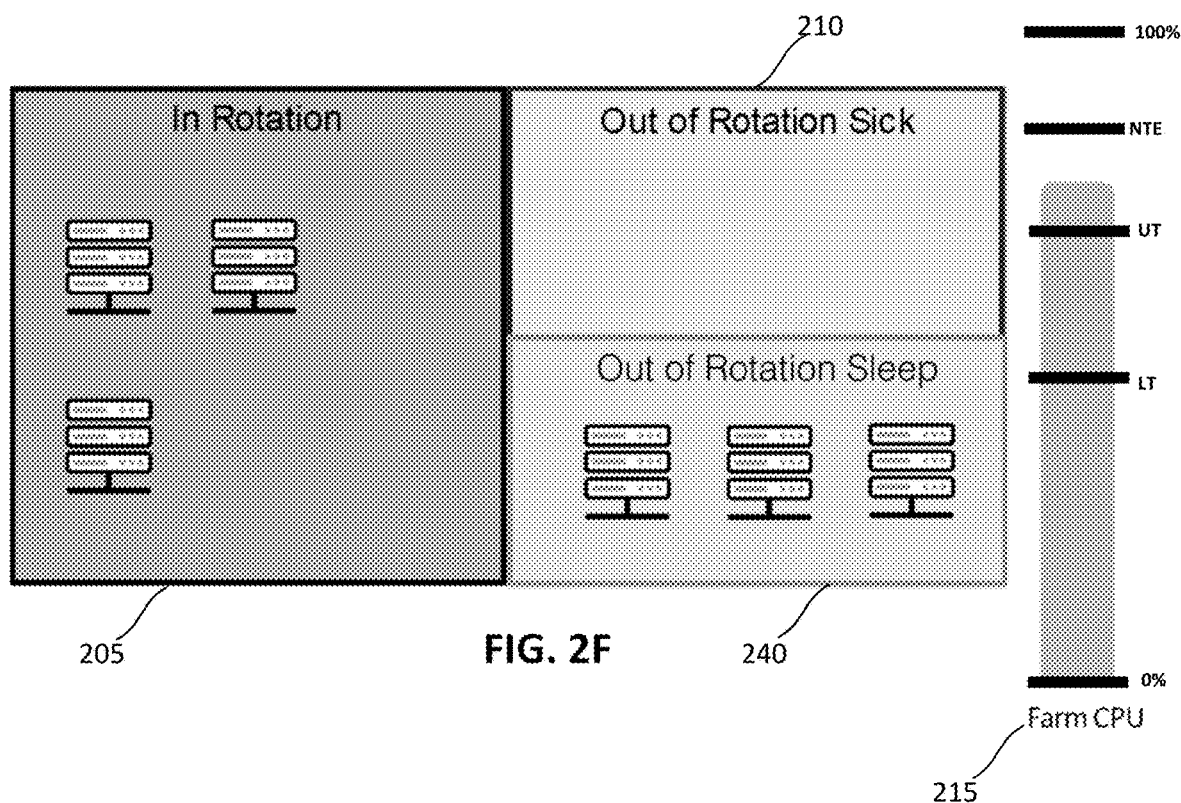
Figure 2G:
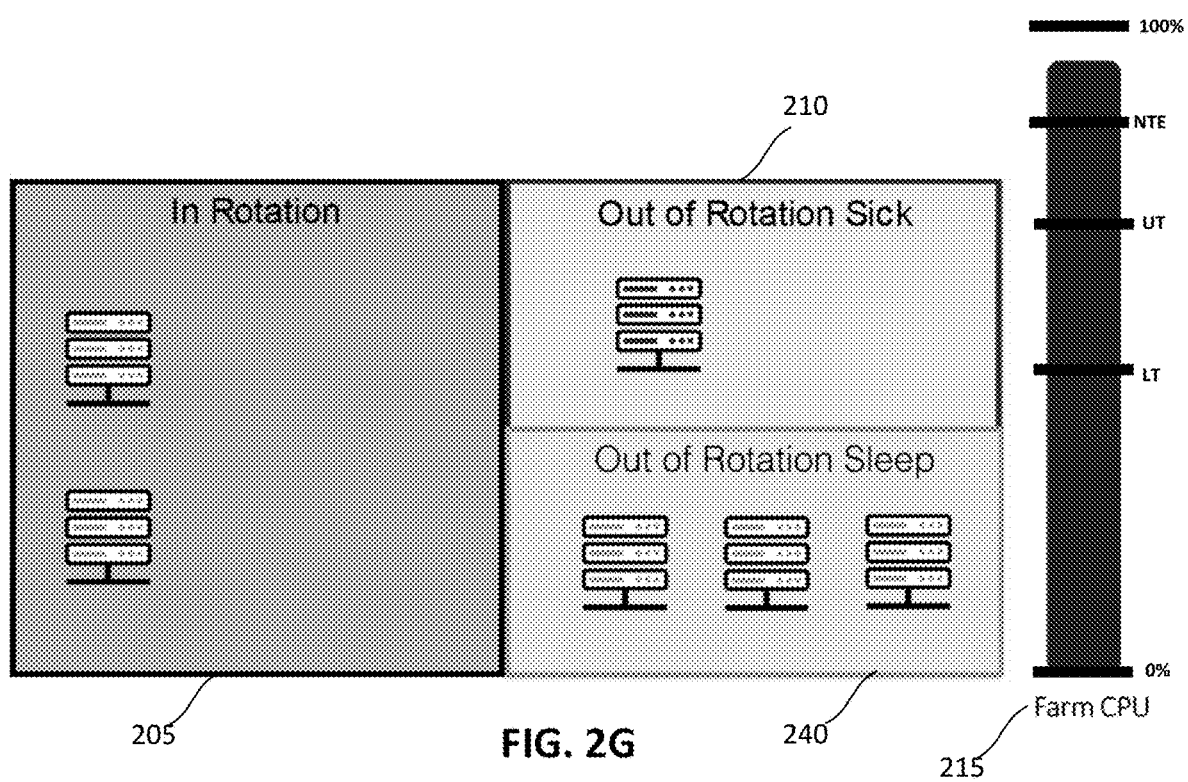
Figure 2H:
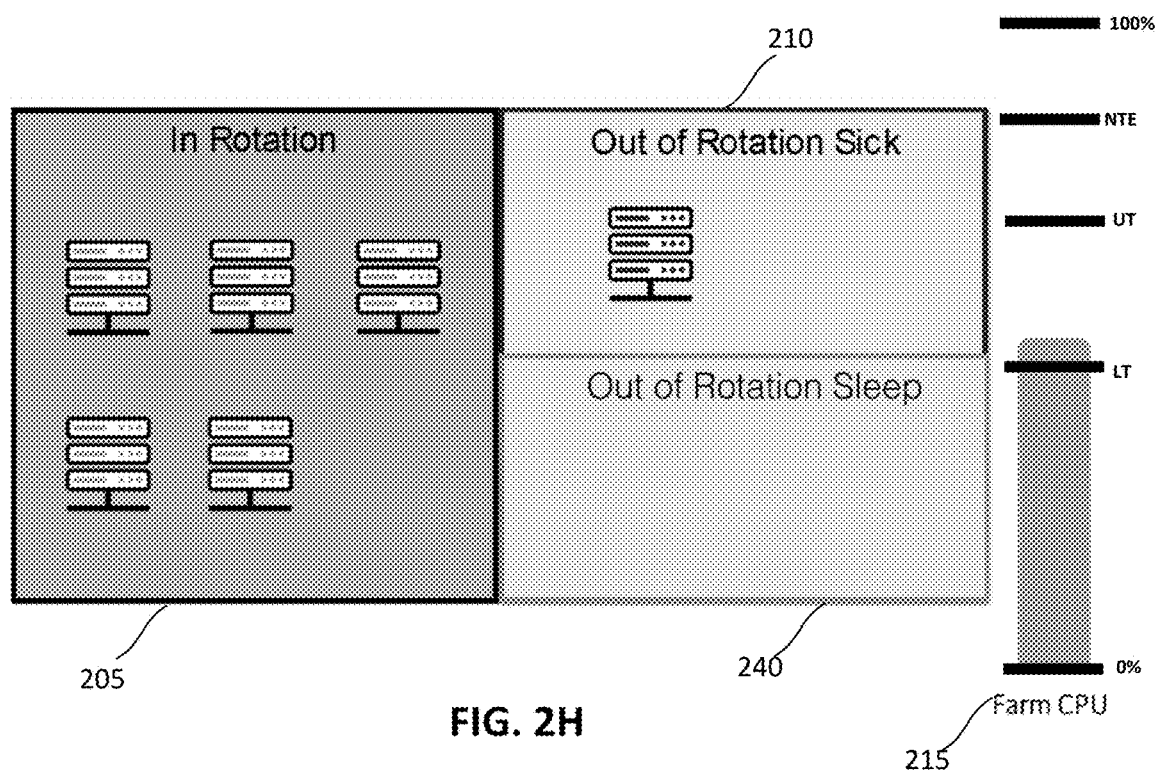
Figure 2I:
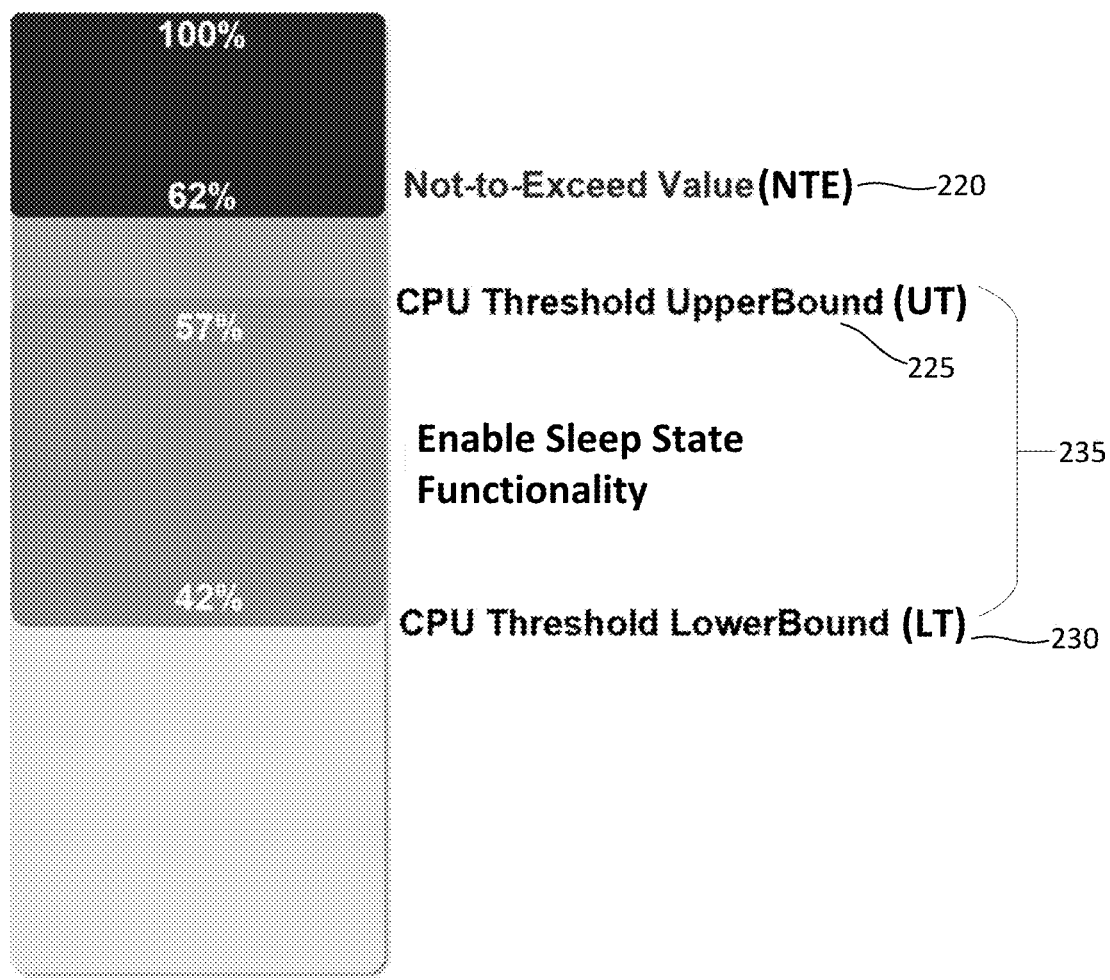

FIG. 2I shows the following thresholds: a CPU usage lower bound 230 (also referred to here as the "LT" or "lower threshold"), a CPU usage upper bound 225 (also referred to herein as the "UT" or "upper threshold"), a not-to-exceed (NTE) bound 220, and a range 235 CPU usage values in which the process for testing the performance of the server for under high utilization to predict how much excess capacity should be maintained by the server farm. The excess capacity may also be referred herein as "unavailable capacity" because this processing capacity is held is reserve because the farm provider may not have a clear idea of how much load may safely be put onto the farm. Thus, some of the processing capacity may be held in reserve to avoid stressing the farm and causing performance problems that may negatively impact the user experience of the tenants of the farm. The farm provider does not want to maintain too much excess capacity due to the cost of operating and maintain the hardware and software necessary to provide the excess processing capacity. The farm provider may be cautious and reserve much more excess capacity that is necessary to ensure that the server farm does not experience issues that may only occur when the farm is operating at a high capacity. As will be shown in the examples which follow, the techniques provided herein may be used to safely identify such issues without impacting the user experience and the excess capacity of the system may be reduced as these issues are identified and corrected.

The CPU usage upper bound 225 represents a CPU usage level for the server farm at which the rotation manager may stop moving virtual machines from the active state 205 to the sleep state 240. The rotation manager may stop moving virtual machines from the active state 205 to the sleep state 240 when CPU usage level is within a predetermined limit of the CPU usage upper bound 225 so that the rotation manager does not inadvertently exceed the CPU usage upper bound 225 by moving another virtual machine from the active state 205 to the sleep state 240. The predetermined limit may be preset range that may be configured by an administrator of the server farm. For example, if the predetermined limit were be set to 3% and the CPU usage for the farm falls within the range 3% below the CPU usage upper bound 225, the rotation manager may stop moving virtual machines to the sleep state. Once the CPU upper bound 225 has been reached, the performance of the system may be monitored to determine whether the system is performing as expected at that CPU usage level.

The not-to-exceed bound 220 represents a CPU usage level that should not be exceeded during capacity testing. The rotation manager will immediately respond to the CPU usage for the farm exceeding the NTE bound 220 by moving all the virtual machines in the sleep state 240 to the active state 205 to increase available capacity of the server farm for handling requests. The NTE bound 220 may be selected to prevent the performance of the system from degrading and impacting the user experience. The NTE bound 220 may be reached if there is a sudden influx of requests from a tenant or tenants and/or one or more of the virtual machines that were in the active state 205 experience problems are moved to the inactive state 210.

Figure 6:
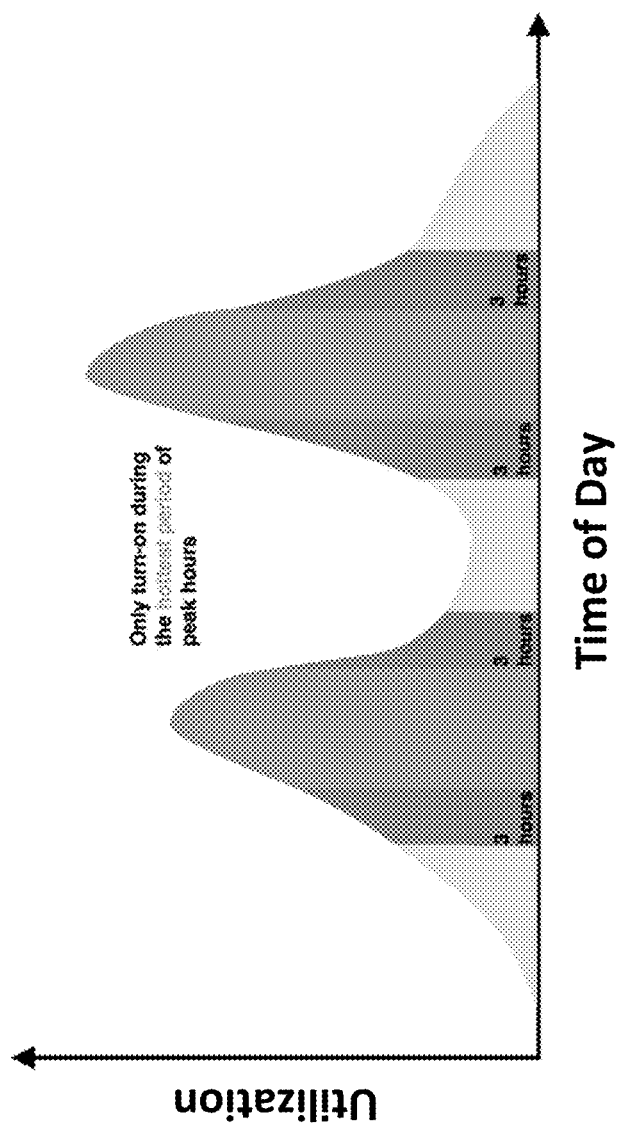
FIG. 6 is a diagram that shows a graph of the utilization of the farm over time.

The CPU usage lower bound 230 represents a minimum CPU utilization overall for the server farm at which the capacity testing techniques described herein may be initialized. FIG. 6, which will be discussed in greater detail in the examples that follow, is a graph that shows how the CPU utilization for the farm may vary over time. Tenants may be active during certain times of the day for a particular time zone or time zones, and the number of requests received by the server farm may increase during those times. Capacity testing is only effective if a sufficient number of requests are coming into the system. During periods of low activity, capacity testing would be ineffective, because it may not be possible to place enough of the virtual machines into the sleep state to increase the utilization of the remaining machines in the active state to a high enough utilization for high-capacity testing. Simulated requests could be generated to increase the utilization, but such simulated traffic may not provide a sufficient substitute for testing under actual usage conditions. The rotation manager may monitor the CPU usage for the farm and automatically initiate the capacity testing in response to the CPU usage exceeding the CPU usage lower bound 230.

FIG. 2C-2H show examples of the server farm from FIGS. 2A and 2B in which the sleep state 240 has been added. In the example shown in FIG. 2C, the six virtual machines are initially in the active state 205 and no virtual machines have been moved out to the inactive state 210 or to the sleep state 240. The farm CPU usage 215 in this example has exceeded the CPU lower threshold 230 but is less than the CPU upper threshold 225. In this example, the farm CPU usage 215 falls within the range 235 in which the capacity testing process may be undertaken.

FIG. 2D shows an example in which the rotation manager of the web-based service provider 110 has moved one of the virtual machines to the sleep state 240 from the active state 205. All six of the virtual machines are operating correctly, therefore none of the virtual machines have been moved to the inactive state 210. The CPU usage 215 has increased from the CPU usage 215 shown in FIG. 2C in response to the virtual machine being rotated out to the sleep state 240. The CPU usage 215 shown in FIG. 2D still falls within the range 235 in which the capacity testing process may be undertaken. The rotation manager may move one virtual machine at a time from the active state 205 to the sleep state 240 to determine the impact on the CPU usage 215. As can be seen in the subsequent examples, the rotation manger may continue moving additional virtual machines from the active state 205 to the sleep state 240 to continue to increase the CPU usage 215d of the farm until the CPU usage 215 comes within a predetermined amount of from the CPU upper threshold 225.

FIG. 2E shows an example in which the rotation manager of the web-based service provider 110 has moved a second of the virtual machines to the sleep state 240 from the active state 205. All six of the virtual machines are operating correctly, therefore none of the virtual machines have been moved to the inactive state 210. The CPU usage 215 has increased from the CPU usage 215 shown in FIG. 2D in response to rotating the second virtual machine to the sleep state 240. The CPU usage 215 still falls within the range 235 in which the capacity testing process may be undertaken. The rotation manager may move one or more additional virtual machines to the sleep state 240 to increase the utilization of the remaining machines in the active state 205.

FIG. 2F shows an example in which the rotation manager of the web-based service provider 110 has moved a third virtual machine of the virtual machines to the sleep state 240 from the active state 205. All six of the virtual machines are operating correctly, therefore none of the virtual machines have been moved to the inactive state 210. The CPU usage 215 has increased from the CPU usage 215 shown in FIG. 2E in response to rotating the third virtual machine to the sleep state 240. The CPU usage 215 has exceeded the CPU upper threshold 225 in FIG. 2F. Therefore, the rotation manager will stop rotating virtual machines into the sleep state 240. The performance of the farm will be monitored to determine how the farm operates at this high utilization rate. Any issues that arise that may impact the user experience may be logged for correction.

FIG. 2G shows an example in which one of the three active virtual machines from the active state 205 is experiencing a problem that requires attention. The rotation manager may move the sick virtual machine to the inactive state 210 so that healing processes may be performed on the virtual machine to correct the problems that arose with the virtual machine. As a result of the virtual machine being moved to the inactive state 210, the CPU usage 215 now exceeds the not-to-exceed bound 220. The rotation manager is configured to detect this event and to respond by moving the virtual machines that were placed in the sleep state 240 into the active state 205 so that those virtual machines enter the work rotation and are able to respond to tenant requests. The virtual machines that were formerly in the sleep state 240 were kept healthy and active by monitoring the virtual machines while the virtual machines were in the sleep state 240. Accordingly, these virtual machines were ready to immediately resume processing of tenant requests once the virtual machines were returned to the active state 205.

FIG. 2H shows the effects of the rotation manager rotating the three virtual machines from the sleep state 240 to the active state 205. The farm CPU usage 215 has now dropped well below the not-to-exceed bound 220. In this example, the CPU usage 215 still exceeds the CPU lower threshold 230, which indicates that there is still enough utilization of the farm computing resources to continue capacity testing. The rotation manager may once again move one or more of the virtual machines from the active state 205 to the sleep state 240 to increase the farm CPU usage 215. Furthermore, once the virtual machine that is in the inactive state 210 has been healed, that virtual machine may be returned to the active state 205 and/or may be moved to the sleep state 240.

FIG. 3 is a diagram that shows how the usable capacity 330 of the server farm of the preceding examples may be determined. The unavailable capacity 310 is the reserved capacity that is being withheld by the load balancer of the web-based service provider 110 to avoid operating the server farm at a high capacity and potentially experiencing issues that would not occur except when operating at such a high capacity. FIG. 3 shows that the available capacity 305 is not the same as the usable capacity 330. The available capacity 305 is the capacity that remains after subtracting the unavailable capacity 310 from the total capacity of the farm. However, a system buffer 315 may be reserved from the available capacity 305 to account for other factors that may limit the available capacity 305 to the usable capacity 330. For example, a capacity may be set aside to account for issues that may arise with the physical machine hosting the virtual machines and/or for health check processes that monitor the health of the virtual machines and/or the physical host machine. In the example shown in FIG. 3, the system buffer 315 reserves 12% of the available capacity 305. However, the size of the system buffer 315 shown in FIG. 3 is merely an example, and the size of the system buffer 315 may be configurable to other values. The usable capacity 330 may be calculated using the following equation:

usable capacity=available capacity*(100%−system buffer)

where available capacity is the available capacity 305 and the system buffer is the system buffer 315.

FIG. 4A is a diagram showing the how health information may be collected for each of the virtual machines of a server farm. The rotation manager make decisions regarding the states to which virtual machines should be moved based on the farm CPU usage value 215. The circuit breaker process 410 obtains the information for determining the farm CPU usage 215 by collecting real-time machine level data from each of the virtual machines 405 using the circuit breaker process 410 which writes virtual machine health information to a data store 420. The virtual machine health information for a virtual machine may include the CPU usage information for the virtual machine indicating how busy the virtual machine is, health status information for the virtual machine indicative of the health of the virtual machine, rotation status information indication of the current state of the virtual machine (e.g., active state 205, inactive state 210, or sleep state 240). The virtual machine health information may include other operating parameter information, such as but not limited to memory usage of the virtual machines and/or a degree of latency introduced by the virtual machines. Each of the virtual machines may also access the data stored in the data store 420 to obtain information regarding the health of the entire server farm.

The circuit breaker process 410 may check the status of each of the virtual machine periodically to obtain the virtual machine health information and write this information to the data store 420. The data store 420 may be implemented by a distributed cache system. In some implementations, the distributed cache system may be implemented by Remote Dictionary Server (Redis). Redis is an open-source, in memory key-value data store that may be used to implement a database, a hash, or other types of data store. Redis provides a faster response time than databases that store data on a disk or solid-state drive, because the Redis data all resides in memory.

In the example shown in FIG. 4A, the data store 420 is a hash table maintained by Redis, and the circuit breaker process 410 writes the virtual machine health information to the hash table. The hash key may be an identifier associated with each virtual machine and the hash value may be the virtual machine health information. The hash table may store the most recently obtained virtual machine health information for each of the virtual machines in the farm. In the example shown in FIG. 4A, the circuit breaker process 410 checks the status of each of the virtual machines every 5 seconds. In other implementations, the frequency at which the circuit breaker process 410 checks the status of each of the virtual machines may be more frequent or less frequent than in this example. The frequency at which the circuit breaker process 410 performs health checks may be configurable by an administrator of the server farm.

FIG. 4B is a diagram showing how the farm configuration information 435 may be updated based on the virtual machine health information stored in the data store 420. The farm configuration information 435 may include operating parameters that may be adjusted to control how much of the available capacity of the server is made available for servicing requests from tenants. The farm configuration information 435 may also include information associated with the overall state of the server farm and may include information for the virtual machines collectively and/or individually. The rotation manager may use the farm configuration information 435 to determine whether capacity testing may be performed for determining whether the capacity testing may continue. The results of the capacity testing may also be written to the farm configuration information 435. A reporting manager may be provided to generate reports that provide the results of the capacity testing and any suggested changes to the configuration of the server farm and/or automatic changes to the configuration of the server farm made in response to the capacity testing.

The VMs 405 may read the virtual machine health information 425 from the data store 420 periodically and update farm configuration information 435 with feature configuration information 430 based on the virtual machine health information 425 read from the data store 420. The rotation manager may read the farm configuration information 435 to determine the current farm CPU data. The rotation manager may then use this information to move virtual machines of the farm from the active state 205, the inactive state 210, and the sleep state 240 as discussed above with respect to FIGS. 2A-2I.

Figure 5:
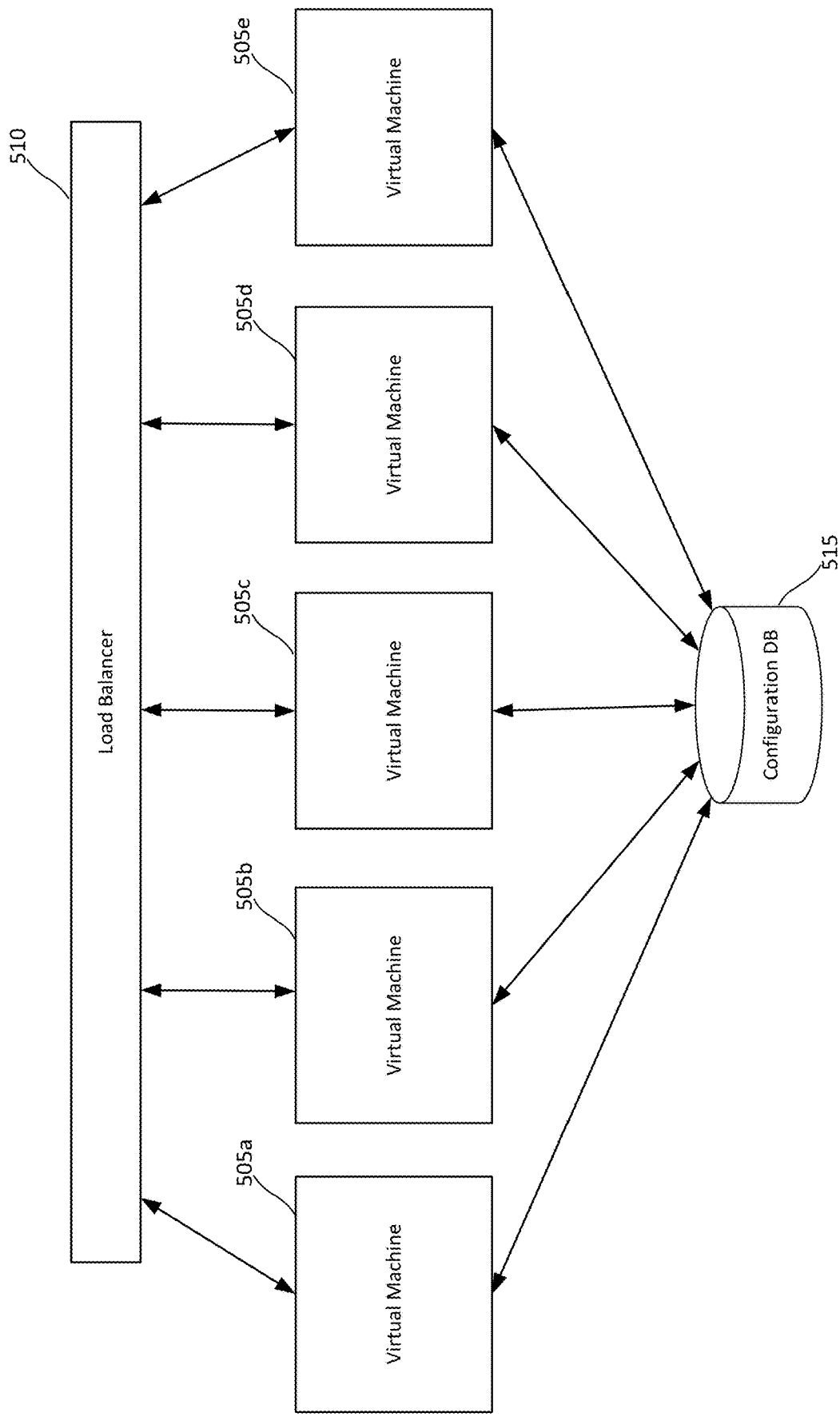
FIG. 5 is a diagram that show an example load balancer that may be implemented by a server farm.

FIG. 5 is a diagram that show an example load balancer 510 that may be implemented by a server farm, such as that used by the web-based service provider 110. The load balancer 510 may be used to distribute requests from tenants to the virtual machines 505a-505e for execution. The configuration database 515 stores configuration data and the virtual machines 505a-505e communicate with the configuration database 515 to obtain information about various configuration values for the system. The configuration database 515 may store the farm configuration information 435 discussed in FIG. 4B.

The load balancer 510 may also implement functionality of the rotation manager discussed in the preceding examples. The load balancer 510 may move the virtual machines 505a-505e between the active state, inactive state, and the sleep state. When a virtual machine is in the inactive state, the load balancer 510 does not forward requests to the virtual machine and may invoke one or more healing processes to return the virtual machine to an active state. When a virtual machine is in the inactive state, the load balancer 510 does not forward tenant requests to the virtual machine. Instead, the health of the virtual machine in the sleep state is monitored by regularly pinging the virtual machine and performing health checks on the virtual machine to ensure that the virtual machine is ready to be moved to an active state as needed. If a problem with the health of the virtual machine is detected while it is in the sleep state, the load balancer 510 may move the virtual machine to an inactive state while the virtual machine is healed.

The configuration database 515 may be used to store settings that indicate the CPU lower threshold 230, the CPU upper threshold 225, the NTE bound 220 shown in FIG. 2I and/or other threshold or boundary information used by load balancer 510 to determine when to move virtual machines from one state to another when performing capacity testing. The rotation manager described in the preceding examples may also access the configuration database 515 to obtain the CPU lower threshold 230, the CPU upper threshold 225, the NTE bound 220, and virtual machine health and utilization information from the configuration database.

FIG. 6 is a diagram that shows a graph of the utilization of the farm over time. The vertical axis (y axis) represents the amount of utilization and the horizontal axis (x axis) represents the time of day. The utilization may be represented as a percentage of the capacity of the farm. In the example utilization graph shown in the FIG. 6, the farm experiences two peak periods. The capacity testing may be performed during these peak periods to ensure that there is sufficient utilization of the farm to test how the system reacts to high capacity usage. During the low and moderate periods of utilization, there may not be sufficient utilization of the farm to test high-capacity usage even if one or more of the virtual machines are put into the sleep stage. The testing of the system at high capacity does not impact the user experiences. The rotation manager monitors the performance of the virtual machines of the farm while the testing is being performed. If any performance problems arise as the utilization of the active virtual machines occurs, the rotation manager may immediately move the one or more virtual machines that are in the sleep state back to the active state to increase the capacity of the farm and reduce the load on each of the virtual machines in the active state.

Figure 7A:
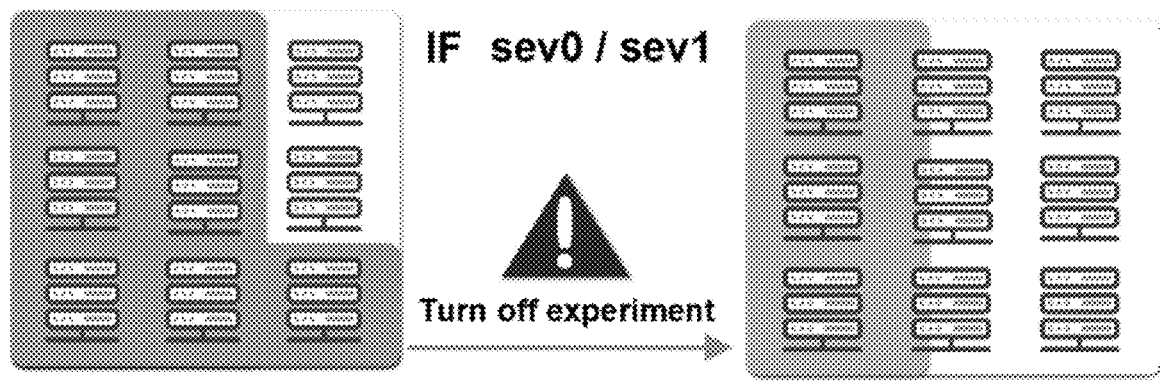
FIGS. 7A and 7B show examples of two safety measure that may be implemented by the rotation manager.
Figure 7B:

FIGS. 7A and 7B show examples of two safety measures that may be implemented by the rotation manager that may cause the rotation manager to immediately abort any capacity testing being performed and cause the rotation manager to return any virtual machines in the sleep state to the active state. FIG. 7A shows an example in which a severity 0 (sev0) event or severity 1 (sev1) event occurs. A sev0 event is a catastrophic event in which all of functions of the farm are down or inaccessible. A sev1 event is a critical event in which has a broad scope of impact that severely impacts the user experience. The occurrence of such events results in the server farm being unable to service requests from tenants.

In some implementations, a monitoring process may monitor the system health to detect the occurrence of such catastrophic and/or critical events. A diagnostic script may be executed to update the configuration database used by the rotation manager to cause the rotation manager to return any virtual machines in the sleep state to the active state. The capacity testing may have uncovered a regression in the code that caused an issue as the utilization increased or another event unrelated to the capacity testing may have caused the catastrophic or critical event to occur. Regardless of the cause, the recovery of the farm back to a state where the farm is capable of servicing requests from the tenants is the critical. If the capacity testing uncovered a problem, system logs and other information that may be used to diagnose what occurred may be collected and stored in a persistent data store for later analysis. This information may be used to correct issues in the program code to prevent the issue from recurring and may also permit the available capacity of the system to be increased once the behavior of the system at higher utilization is better understood and known problems are addressed. Thus, more of the capacity of the farm may be utilized for handling tenant requests and not merely held in reserve in case a problem arises that requires that excess capacity.

FIG. 7B shows an example of another safeguard that may be implemented by the rotation manager. The rotation manager may implement a safety net limit that places an upper limit on the number of virtual machines that may be moved to the sleep state or a minimum number of virtual machines that may remain in the active state. Once such a limit is reached, all the virtual machines in the sleep state may be returned to the active state to ensure that the farm is capable handling requests from the tenants. A sudden spike in requests or the health issue with one of the virtual machines in the active state could result in the system being unable to handle the requests and a corresponding degradation of the user experience.

Figure 8:
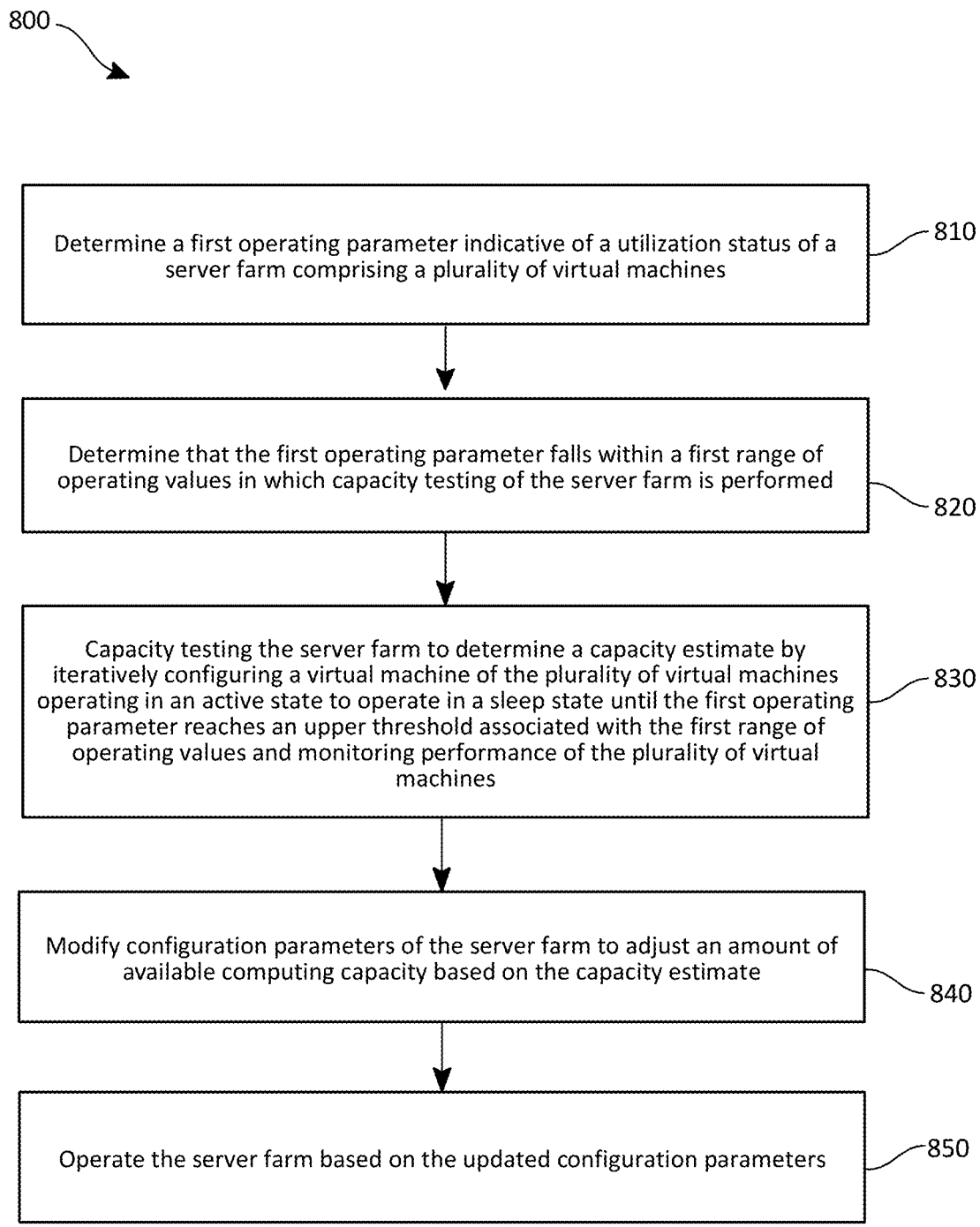
FIG. 8 is a flow chart of an example process for determining capacity limits of a server farm.

FIG. 8 is a flow chart of an example process 800 for determining capacity limits of a server farm. The process 800 may be implemented by the rotation manager of the web-based service provider 110.

The process 800 may include an operation 810 of determining a first operating parameter indicative of a utilization status of a server farm comprising a plurality of virtual machines. The first operating parameter may be the current CPU usage 215 of the server farm. The rotation manager may determine the current CPU usage 215 based on the virtual machine health information stored in the data store 420. While the examples discussed herein are utilize the CPU usage 215 for capacity testing. However, the virtual machine health information may include other operating parameter information, such as but not limited to memory usage of the virtual machines and/or a degree latency introduced by the virtual machines. These other operation parameters may be used for capacity testing in addition to or instead of the CPU usage.

The process 800 may include an operation 820 of determining that the first operating parameter falls within a first range of operating values in which capacity testing of the server farm is performed. With respect to the CPU usage 215, the rotation manager may determine that the CPU usage falls within the range 235 shown in FIG. 2I. The range 235 is based on CPU usage. However, other ranges may be defined for other operating parameters, such as but not limited to the memory usage of the virtual machines and/or the degree of latency introduced by the virtual machines.

The process 800 may include an operation 830 of capacity testing the server farm to determine a capacity estimate by iteratively configuring a virtual machine of the plurality of virtual machines operating in an active state to operate in a sleep state until the first operating parameter reaches an upper threshold associated with the first range of operating values and monitoring performance of the plurality of virtual machines. The rotation manager may move virtual machines from the active state 205 to the sleep state 240 to increase the utilization of the CPU and/or other resource used by the virtual machines remaining in the active state. The performance of the virtual machines may be monitored, and the states of virtual machines modified as described with respect to FIGS. 2C-2I.

The process 800 may include an operation 840 of modifying configuration parameters of the server farm to adjust an amount of available computing capacity based on the capacity estimate. If the capacity testing shows that the system is capable of functioning correctly at a higher utilization rate than the system is configured to support, the amount of reserved capacity 310 may be decreased to reflect the capacity at which the virtual machines of the server farm were operating during the capacity testing. If the capacity testing demonstrated that the amount of reserved capacity 310 was too high, and some of that reserved capacity 310 may be allocated to the available capacity 305. For example, if the capacity testing showed that the system performance was acceptable at a capacity that is 5% higher than the current available capacity 305, then the available capacity 305 may be increased by 5% and the reserved capacity 310 decreased by 5%.

The process 800 may include an operation 850 of operating the server farm based on the updated configuration parameters. The updated capacity information may be stored in the configuration database 515 may be updated responsive to the capacity testing showing that the reserved capacity 310 may be reduced and this capacity may be added to the available capacity that may be used by the virtual machines of the server farm to service requests coming from tenants. The capacity bounds shown in FIG. 2I may be updated to reflect the updated capacity limits and may be used to perform further capacity testing by the rotation manager of the web-based service provider 110.

The detailed examples of systems, devices, and techniques described in connection with FIGS. 1-8 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-8 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 9:
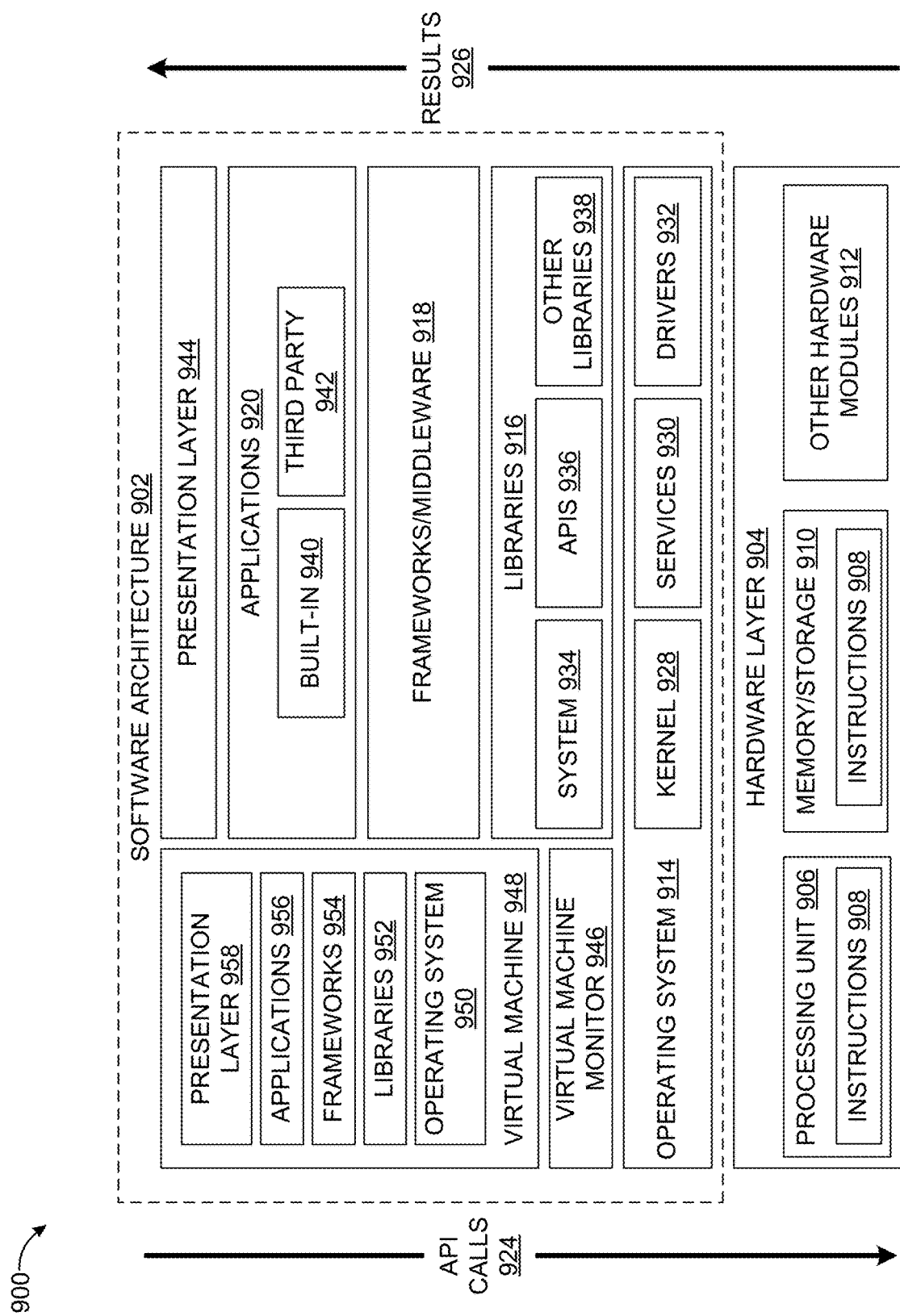
FIG. 9 is a block diagram illustrating an example software architecture, various portions of which may be used in conjunction with various hardware architectures herein described, which may implement any of the features herein described.

FIG. 9 is a block diagram 900 illustrating an example software architecture 902, various portions of which may be used in conjunction with various hardware architectures herein described, which may implement any of the above-described features. FIG. 9 is a non-limiting example of a software architecture and it will be appreciated that many other architectures may be implemented to facilitate the functionality described herein. The software architecture 902 may execute on hardware such as a machine 1000 of FIG. 10 that includes, among other things, processors 1010, memory 1030, and input/output (I/O) components 1050. A representative hardware layer 904 is illustrated and can represent, for example, the machine 1000 of FIG. 10. The representative hardware layer 904 includes a processing unit 906 and associated executable instructions 908. The executable instructions 908 represent executable instructions of the software architecture 902, including implementation of the methods, modules and so forth described herein. The hardware layer 904 also includes a memory/storage 910, which also includes the executable instructions 908 and accompanying data. The hardware layer 904 may also include other hardware modules 912. Instructions 908 held by processing unit 906 may be portions of instructions 908 held by the memory/storage 910.

The example software architecture 902 may be conceptualized as layers, each providing various functionality. For example, the software architecture 902 may include layers and components such as an operating system (OS) 914, libraries 916, frameworks 918, applications 920, and a presentation layer 944. Operationally, the applications 920 and/or other components within the layers may invoke API calls 924 to other layers and receive corresponding results 926. The layers illustrated are representative in nature and other software architectures may include additional or different layers. For example, some mobile or special purpose operating systems may not provide the frameworks/middleware 918.

The OS 914 may manage hardware resources and provide common services. The OS 914 may include, for example, a kernel 928, services 930, and drivers 932. The kernel 928 may act as an abstraction layer between the hardware layer 904 and other software layers. For example, the kernel 928 may be responsible for memory management, processor management (for example, scheduling), component management, networking, security settings, and so on. The services 930 may provide other common services for the other software layers. The drivers 932 may be responsible for controlling or interfacing with the underlying hardware layer 904. For instance, the drivers 932 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 916 may provide a common infrastructure that may be used by the applications 920 and/or other components and/or layers. The libraries 916 typically provide functionality for use by other software modules to perform tasks, rather than rather than interacting directly with the OS 914. The libraries 916 may include system libraries 934 (for example, C standard library) that may provide functions such as memory allocation, string manipulation, file operations. In addition, the libraries 916 may include API libraries 936 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 916 may also include a wide variety of other libraries 938 to provide many functions for applications 920 and other software modules.

The frameworks 918 (also sometimes referred to as middleware) provide a higher-level common infrastructure that may be used by the applications 920 and/or other software modules. For example, the frameworks 918 may provide various graphic user interface (GUI) functions, high-level resource management, or high-level location services. The frameworks 918 may provide a broad spectrum of other APIs for applications 920 and/or other software modules.

The applications 920 include built-in applications 940 and/or third-party applications 942. Examples of built-in applications 940 may include, but are not limited to, a contacts application, a browser application, a location application, a media application, a messaging application, and/or a game application. Third-party applications 942 may include any applications developed by an entity other than the vendor of the particular platform. The applications 920 may use functions available via OS 914, libraries 916, frameworks 918, and presentation layer 944 to create user interfaces to interact with users.

Some software architectures use virtual machines, as illustrated by a virtual machine 948. The virtual machine 948 provides an execution environment where applications/modules can execute as if they were executing on a hardware machine (such as the machine 1000 of FIG. 10, for example). The virtual machine 948 may be hosted by a host OS (for example, OS 914) or hypervisor, and may have a virtual machine monitor 946 which manages operation of the virtual machine 948 and interoperation with the host operating system. A software architecture, which may be different from software architecture 902 outside of the virtual machine, executes within the virtual machine 948 such as an OS 950, libraries 952, frameworks 954, applications 956, and/or a presentation layer 958.

Figure 10:
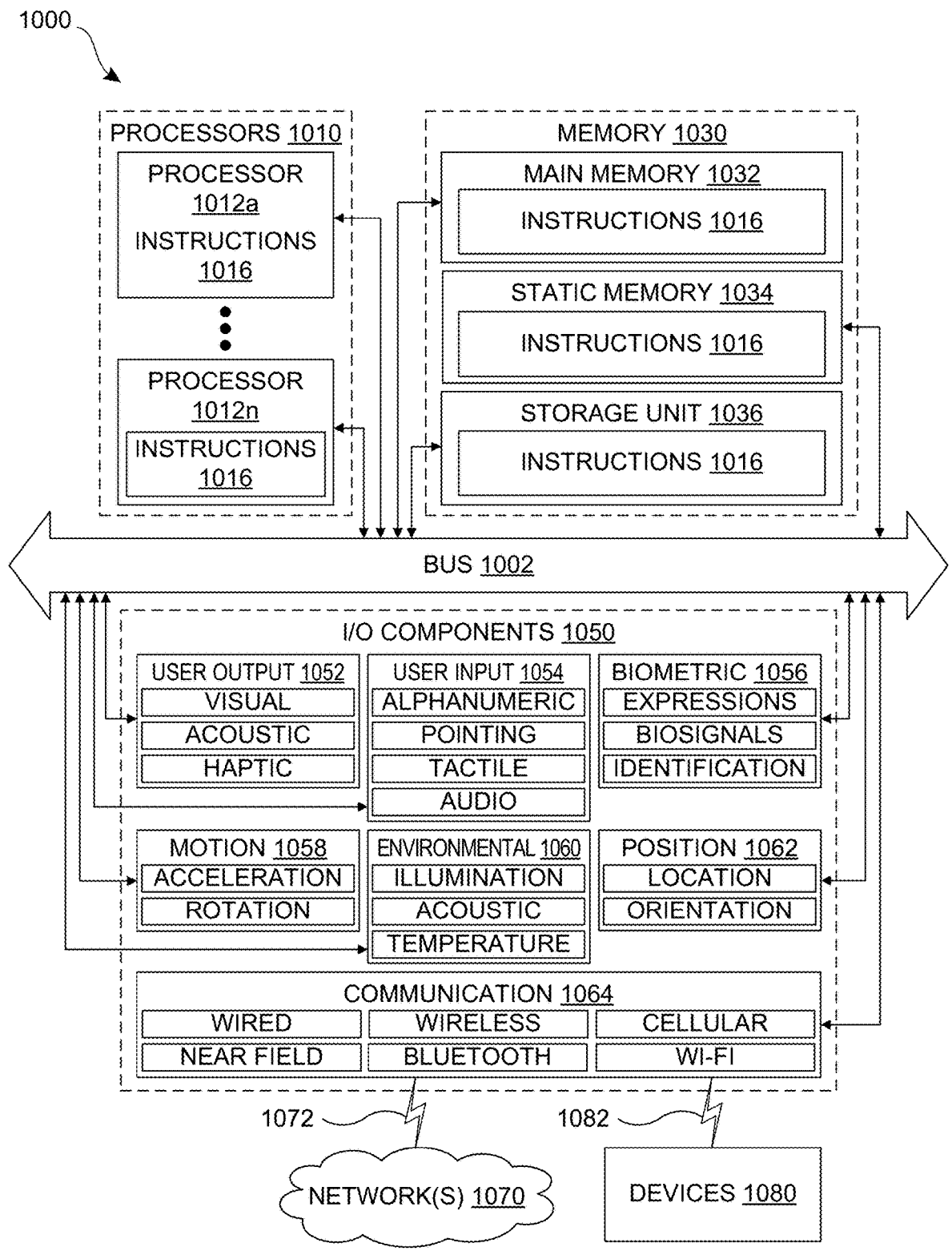
FIG. 10 is a block diagram illustrating components of an example machine configured to read instructions from a machine-readable medium and perform any of the features described herein.

FIG. 10 is a block diagram illustrating components of an example machine 1000 configured to read instructions from a machine-readable medium (for example, a machine-readable storage medium) and perform any of the features described herein. The example machine 1000 is in a form of a computer system, within which instructions 1016 (for example, in the form of software components) for causing the machine 1000 to perform any of the features described herein may be executed. As such, the instructions 1016 may be used to implement modules or components described herein. The instructions 1016 cause unprogrammed and/or unconfigured machine 1000 to operate as a particular machine configured to carry out the described features. The machine 1000 may be configured to operate as a standalone device or may be coupled (for example, networked) to other machines. In a networked deployment, the machine 1000 may operate in the capacity of a server machine or a client machine in a server-client network environment, or as a node in a peer-to-peer or distributed network environment. Machine 1000 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1000 is illustrated, the term "machine" includes a collection of machines that individually or jointly execute the instructions 1016.

The machine 1000 may include processors 1010, memory 1030, and I/O components 1050, which may be communicatively coupled via, for example, a bus 1002. The bus 1002 may include multiple buses coupling various elements of machine 1000 via various bus technologies and protocols. In an example, the processors 1010 (including, for example, a central processing unit (CPU), a graphics processing unit (GPU), a digital signal processor (DSP), an ASIC, or a suitable combination thereof) may include one or more processors 1012a to 1012n that may execute the instructions 1016 and process data. In some examples, one or more processors 1010 may execute instructions provided or identified by one or more other processors 1010. The term "processor" includes a multi-core processor including cores that may execute instructions contemporaneously. Although FIG. 10 shows multiple processors, the machine 1000 may include a single processor with a single core, a single processor with multiple cores (for example, a multi-core processor), multiple processors each with a single core, multiple processors each with multiple cores, or any combination thereof. In some examples, the machine 1000 may include multiple processors distributed among multiple machines.

The memory/storage 1030 may include a main memory 1032, a static memory 1034, or other memory, and a storage unit 1036, both accessible to the processors 1010 such as via the bus 1002. The storage unit 1036 and memory 1032, 1034 store instructions 1016 embodying any one or more of the functions described herein. The memory/storage 1030 may also store temporary, intermediate, and/or long-term data for processors 1010. The instructions 1016 may also reside, completely or partially, within the memory 1032, 1034, within the storage unit 1036, within at least one of the processors 1010 (for example, within a command buffer or cache memory), within memory at least one of I/O components 1050, or any suitable combination thereof, during execution thereof. Accordingly, the memory 1032, 1034, the storage unit 1036, memory in processors 1010, and memory in I/O components 1050 are examples of machine-readable media.

As used herein, "machine-readable medium" refers to a device able to temporarily or permanently store instructions and data that cause machine 1000 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1016) for execution by a machine 1000 such that the instructions, when executed by one or more processors 1010 of the machine 1000, cause the machine 1000 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1050 may include a wide variety of hardware components adapted to receive input, provide output, produce output, transmit information, exchange information, capture measurements, and so on. The specific I/O components 1050 included in a particular machine will depend on the type and/or function of the machine. For example, mobile devices such as mobile phones may include a touch input device, whereas a headless server or IoT device may not include such a touch input device. The particular examples of I/O components illustrated in FIG. 10 are in no way limiting, and other types of components may be included in machine 1000. The grouping of I/O components 1050 are merely for simplifying this discussion, and the grouping is in no way limiting. In various examples, the I/O components 1050 may include user output components 1052 and user input components 1054. User output components 1052 may include, for example, display components for displaying information (for example, a liquid crystal display (LCD) or a projector), acoustic components (for example, speakers), haptic components (for example, a vibratory motor or force-feedback device), and/or other signal generators. User input components 1054 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1050 may include biometric components 1056, motion components 1058, environmental components 1060, and/or position components 1062, among a wide array of other physical sensor components. The biometric components 1056 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1058 may include, for example, acceleration sensors (for example, an accelerometer) and rotation sensors (for example, a gyroscope). The environmental components 1060 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1062 may include, for example, location sensors (for example, a Global Position System (GPS) receiver), altitude sensors (for example, an air pressure sensor from which altitude may be derived), and/or orientation sensors (for example, magnetometers).

The I/O components 1050 may include communication components 1064, implementing a wide variety of technologies operable to couple the machine 1000 to network(s) 1070 and/or device(s) 1080 via respective communicative couplings 1072 and 1082. The communication components 1064 may include one or more network interface components or other suitable devices to interface with the network(s) 1070. The communication components 1064 may include, for example, components adapted to provide wired communication, wireless communication, cellular communication, Near Field Communication (NFC), Bluetooth communication, Wi-Fi, and/or communication via other modalities. The device(s) 1080 may include other machines or various peripheral devices (for example, coupled via USB).

In some examples, the communication components 1064 may detect identifiers or include components adapted to detect identifiers. For example, the communication components 1064 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1062, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a computer-readable medium storing executable instructions for causing the processor to perform operations comprising:
      determining a first operating parameter indicative of a utilization status of a server farm comprising a plurality of virtual machines;
      determining that the first operating parameter falls within a first range of operating values in which capacity testing of the server farm is performed;
      capacity testing the server farm to determine a capacity estimate by:
         iteratively configuring a virtual machine of the plurality of virtual machines operating in an active state to operate in a sleep state until the first operating parameter reaches an upper threshold associated with the first range of operating values, and
         monitoring performance of the plurality of virtual machines;
      modifying configuration parameters of the server farm to adjust an amount of available computing capacity based on the capacity estimate; and
      operating the server farm based on the modified configuration parameters.

2. The data processing system of claim 1, wherein the first operating parameter is a central processing unit (CPU) usage parameter indicating an amount of CPU usage by the plurality of virtual machines.

3. The data processing system of claim 1, wherein the first operating parameter is a memory usage parameter indicating how much memory is being used by the plurality of virtual machines.

4. The data processing system of claim 1, wherein the first operating parameter is a latency parameter indicating a degree of latency experienced by the plurality of virtual machines when processing requests.

5. The data processing system of claim 1, wherein to capacity test the server farm, the computer-readable medium includes instructions to cause the processor to perform operations of:
 detecting that the first operating parameter has exceeded a not-to-exceed threshold; and
 reconfiguring all virtual machines configured to operate in the sleep state to operate in the active state responsive to detecting that the first operating parameter has exceeded the not-to-exceed threshold.

6. The data processing system of claim 1, wherein to capacity test the server farm, the computer-readable medium includes instructions to cause the processor to perform operations of:
 detecting an occurrence of an event that causes the server farm to be unable to service user requests; and
 reconfiguring all virtual machines configured to operate in the sleep state to operate in the active state, responsive to detecting the occurrence of the event.

7. The data processing system of claim 1, wherein to capacity test the server farm, the computer-readable medium includes instructions to cause the processor to perform operations of:
 monitoring a health and availability of the virtual machines configured to operate in the sleep state; and
 performing one or more maintenance actions on the virtual machines in the sleep state responsive to detecting a performance problem that impacts the health and availability of the virtual machines in the sleep state.

8. A method implemented in a data processing system for determining a capacity of a server farm, the method comprising:
 determining a first operating parameter indicative of a utilization status of the server farm comprising a plurality of virtual machines;
 determining that the first operating parameter falls within a first range of operating values in which capacity testing of the server farm is performed;
 capacity testing the server farm to determine a capacity estimate by:
  iteratively configuring a virtual machine of the plurality of virtual machines operating in an active state to operate in a sleep state until the first operating parameter reaches an upper threshold associated with the first range of operating values, and
  monitoring performance of the plurality of virtual machines;
 modifying configuration parameters of the server farm to adjust an amount of available computing capacity based on the capacity estimate; and
 operating the server farm based on the modified configuration parameters.

9. The method of claim 8, wherein the first operating parameter is a central processing unit (CPU) usage parameter indicating an amount of CPU usage by the plurality of virtual machines.

10. The method of claim 8, wherein the first operating parameter is a memory usage parameter indicating how much memory is being used by the plurality of virtual machines.

11. The method of claim 8, wherein the first operating parameter is a latency parameter indicating a degree of latency experienced by the plurality of virtual machines when processing requests.

12. The method of claim 8, wherein capacity testing the server farm further comprises:
 detecting that the first operating parameter has exceeded a not-to-exceed threshold; and
 reconfiguring all virtual machines configured to operate in the sleep state to operate in the active state responsive to detecting that the first operating parameter has exceeded a not-to-exceed threshold.

13. The method of claim 8, wherein capacity testing the server farm further comprises:
 detecting an occurrence of an event that causes the server farm to be unable to service user requests; and
 reconfiguring all virtual machines configured to operate in the sleep state to operate in the active state, responsive to detecting the occurrence of the event.

14. The method of claim 8, wherein capacity testing the server farm further comprises:
 monitoring a health and availability of the virtual machines configured to operate in the sleep state; and
 performing one or more maintenance actions on the virtual machines in the sleep state responsive to detecting a performance problem that impacts the health and availability of the virtual machines in the sleep state.

15. A machine-readable medium on which are stored instructions that, when executed, cause a processor of a programmable device to perform functions of:
 determining a first operating parameter indicative of a utilization status of a server farm comprising a plurality of virtual machines;
 determining that the first operating parameter falls within a first range of operating values in which capacity testing of the server farm is performed;
 capacity testing the server farm to determine a capacity estimate by:
  iteratively configuring a virtual machine of the plurality of virtual machines operating in an active state to operate in a sleep state until the first operating parameter reaches an upper threshold associated with the first range of operating values, and
  monitoring performance of the plurality of virtual machines;
 modifying configuration parameters of the server farm to adjust an amount of available computing capacity based on the capacity estimate; and
 operating the server farm based on the modified configuration parameters.

16. The machine-readable medium of claim 15, wherein the first operating parameter is a central processing unit (CPU) usage parameter indicating an amount of CPU usage by the plurality of virtual machines.

17. The machine-readable medium of claim 15, wherein the first operating parameter is a memory usage parameter indicating how much memory is being used by the plurality of virtual machines or a latency parameter indicating a degree of latency experienced by the plurality of virtual machines when processing requests.

18. The machine-readable medium of claim 15, wherein to capacity test the server farm, the machine-readable medium includes instructions to cause the processor to perform operations of:
   detecting that the first operating parameter has exceeded a not-to-exceed threshold; and
   reconfiguring all virtual machines configured to operate in the sleep state to operate in the active state responsive to detecting that the first operating parameter has exceeded a not-to-exceed threshold.

19. The machine-readable medium of claim 15, wherein to capacity test the server farm, the machine-readable medium includes instructions to cause the processor to perform operations of:
   detecting an occurrence of an event that causes the server farm be unable to service user requests; and
   reconfiguring all virtual machines configured to operate in the sleep state to operate in the active state responsive to detecting the occurrence of the event.

20. The machine-readable medium of claim 15, wherein to capacity test the server farm, the machine-readable medium includes instructions to cause the processor to perform operations of:
   monitoring a health and availability of the virtual machines configured to operate in the sleep state; and
   performing one or more maintenance actions on the virtual machines in the sleep state responsive to detecting a performance problem that impacts the health and availability of the virtual machines in the sleep state.

* * * * *